(12) United States Patent
Dutta et al.

(10) Patent No.: US 9,716,917 B2
(45) Date of Patent: Jul. 25, 2017

(54) METHOD AND APPARATUS FOR PROCESSING CONTENT RECORDING IN NETWORK

(71) Applicant: Samsung Electronics Co., Ltd., Suwon-si, Gyeonggi-do (KR)

(72) Inventors: Deepjyoti Dutta, Noida (IN); Amit Sharma, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/962,382

(22) Filed: Dec. 8, 2015

(65) Prior Publication Data

US 2016/0173957 A1    Jun. 16, 2016

(30) Foreign Application Priority Data

Dec. 12, 2014 (IN) .......................... 6293/CHE/2014
Nov. 26, 2015 (KR) ........................ 10-2015-0166747

(51) Int. Cl.

| | | |
|---|---|---|
| *H04N 7/173* | (2011.01) | |
| *H04N 21/6543* | (2011.01) | |
| *H04L 12/28* | (2006.01) | |
| *H04N 21/4147* | (2011.01) | |
| *H04N 21/239* | (2011.01) | |
| *H04N 21/258* | (2011.01) | |
| *H04N 21/2662* | (2011.01) | |
| *G09G 5/00* | (2006.01) | |
| *H04L 29/08* | (2006.01) | |

(52) U.S. Cl.
CPC ........... *H04N 21/6543* (2013.01); *G09G 5/00* (2013.01); *H04L 12/2803* (2013.01); *H04L 12/2809* (2013.01); *H04L 12/2829* (2013.01); *H04N 21/2393* (2013.01); *H04N 21/25808* (2013.01); *H04N 21/2662* (2013.01); *H04N 21/4147* (2013.01); *H04L 67/306* (2013.01); *H04L 2012/2849* (2013.01)

(58) Field of Classification Search
CPC ............. H04N 1/3275; H04N 21/6543; H04N 21/4147; H04N 21/2393; H04N 21/25808; H04N 21/2662; H04L 12/2803; H04L 67/306; H04L 12/2809; H04L 12/2829; H04L 2012/2849; G09G 5/00
USPC ....... 725/14, 58, 90, 100, 102, 139; 386/293
See application file for complete search history.

(56) References Cited

U.S. PATENT DOCUMENTS

| | | | | |
|---|---|---|---|---|
| 8,229,282 | B2 * | 7/2012 | Kamiwada | ............ H04N 5/781 386/239 |
| 8,601,515 | B2 | 12/2013 | Sparrell | |
| 8,650,597 | B2 | 2/2014 | Park et al. | |
| 8,707,351 | B2 | 4/2014 | Dharmaji | |
| 2005/0204388 | A1 * | 9/2005 | Knudson | ............ H04N 5/44543 725/58 |

(Continued)

*Primary Examiner* — Nnenna Ekpo
(74) *Attorney, Agent, or Firm* — Jefferson IP Law, LLP

(57) ABSTRACT

A method and an apparatus for processing content recording in a network are provided. The method for operating a media server to process a recording request in a network includes registering a plurality of user devices, receiving, from at least one user device among the plurality of user devices, at least one recording request, determining at least one priority of the at least one recording request, and processing the at least one recording request in accordance with the at least one priority.

16 Claims, 17 Drawing Sheets

(56) References Cited

U.S. PATENT DOCUMENTS

| | | | |
|---|---|---|---|
| 2005/0251829 A1* | 11/2005 | Kondo | H04N 5/782 725/55 |
| 2006/0064721 A1* | 3/2006 | Del Val | H04N 5/44543 725/41 |
| 2006/0093325 A1* | 5/2006 | Imai | H04N 5/775 386/296 |
| 2006/0239642 A1* | 10/2006 | Yuasa | H04L 12/2805 386/286 |
| 2011/0142422 A1* | 6/2011 | Friedman | H04N 5/765 386/297 |
| 2013/0305292 A1 | 11/2013 | Chen et al. | |
| 2014/0115632 A1* | 4/2014 | Sasaki | H04N 21/462 725/44 |
| 2014/0153907 A1* | 6/2014 | Farah | H04N 9/7921 386/297 |
| 2015/0062344 A1* | 3/2015 | Sano | G11B 27/11 348/159 |
| 2015/0089554 A1* | 3/2015 | Phillips | H04N 21/26258 725/92 |

* cited by examiner

METHOD AND APPARATUS FOR PROCESSING CONTENT RECORDING IN NETWORK

CROSS-REFERENCE TO RELATED APPLICATION(S)

This application claims the benefit under 35 U.S.C. §119 (a) of an Indian patent application filed on Dec. 12, 2014 in the Indian Intellectual Property Office and assigned Serial number 6293/CHE/2014 and of a Korean patent application filed on Nov. 26, 2015 in the Korean Intellectual Property Office and assigned Serial number 10-2015-0166747, the entire disclosure of each of which is hereby incorporated by reference.

TECHNICAL FIELD

The present disclosure relates to a method and an apparatus for processing content recording in a network.

BACKGROUND

Satellite television (TV) sets provide users with a wide variety of media content. A satellite TV set consists of a set top box, a dish antenna, and a media rendering device. The dish antenna receives satellite signals carrying media contents and transmits the satellite signals to the set top box. The set top box decodes the satellite signals, retrieves the media content and renders the media content on the media rendering device. Examples of the media rendering device includes smart TVs, audio/video receivers, video displays, and remote speakers. The set top box has a memory storage associated therewith. Further, the set top box includes a digital video recorder capable of digitally recording media content retrieved from the satellite signal.

In a home network, the set top box is connected to a plurality of media rendering devices. The set top box is capable of broadcasting media content to the plurality of media rendering devices simultaneously. Existing methods allow the set top box to record the broadcasted media content, thereby enabling the user to view the recorded media content, at a desired time.

In the related art, a set top box receives requests to record a plurality of broadcast content from a media renderer device at the same time. The set top box records broadcast contents from the plurality of broadcast content in accordance with user preferences. In one illustration of the related art, the user wishes to watch a sports match and a news program content. As a result, a user sends requests to the set top box to render both the sports match and the news program content. The set top box renders one of the sports match and the news program content on the media rendering device. Further, the set top box records the other broad cast content, so as to enable the user to view the broad cast content in the future. However, the set top box fails to handle recording requests from a plurality of media rendering devices.

In another example of the related art, a set top box receives requests to record a plurality of broadcast content from a media renderer device at the same time. The set top box assigns priority to recording requests received from the media rendering device. The set top box maintains a priority list of recording requests in accordance with the priority of the recording requests. Further, the system excludes a set of recording requests from a recording schedule based on the priority of the set of recording requests. As a result, the system reduces an amount of work done by the set top box. However, the system fails to provide a time efficient system for reducing the processing time and providing a quicker response to the recording request. Further, the set top box lacks the ability to manage recording requests from a plurality of media rendering devices.

Nowadays in a home network scenario, a plurality of media rendering devices is connected to the set top box. The set top box streams broadcast content to each of media rendering device among the plurality of media rendering devices. It is often desired in such scenarios that the user is able to prioritize the recording requests sent to the set top box. For example, when a parent and a child sends recording requests to the set top box, it is desired to process a first recording request sent by the parent prior to processing a second recording request sent by the child.

In light of the foregoing discussion, there is need for a method and system to manage multiple recording requests from a plurality of media rendering devices in a home network. Further, it is desired to process recording requests transmitted by the plurality of media rendering devices in accordance with priority of the recording requests.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system that allows a digital media server (DMS) to process recording requests among multiple renderer devices in a home network.

In accordance with an aspect of the present disclosure, a method of processing recording requests in a home network is provided. The method includes registering a plurality of user devices with a DMS. The method includes receiving a recording request from at least one user control device by the DMS. The method includes extracting metadata of at least one of the recording request and the ongoing recording request. Further, the method includes analyzing the metadata of at least one of the recording request and the ongoing recording request based on predefined rules. Furthermore, the method includes processing the recording request based on the analysis.

In accordance with another aspect of the present disclosure, a method of managing recording requests among multiple media renderer devices in a home network environment is provided. The method includes registering a plurality of user control devices with a DMS. The method includes sending a recording request of a broadcast content from a first user control device. The first user device is mapped to a first media renderer. Further, the method includes receiving and extracting metadata of the recording request and metadata of ongoing recording requests by the media server. The method includes analyzing the metadata of the recording request based on predefined rules. Furthermore, the method includes notifying the outcome of the recording request to the first media renderer via the user control device.

In accordance with another aspect of the present disclosure, a system for managing a plurality of recording requests among multiple renderer devices in a home network is provided. The system includes a DMS to manage a plurality of recording requests and a plurality of media rendering devices connected in home network. The DMS includes a registration module to enable registration of a plurality of user control devices with the DMS. Further, the DMS includes a response handler module sends an outcome of the recording request to at least one of the user control device. The DMS includes a recorder management module to identify ongoing recording requests processed in the DMS. Further, the DMS includes a metadata retrieving module to extract metadata of at least one of the recording request and the ongoing recording request. Furthermore, the DMS includes a decision undertaking module to analyze the metadata of at least one of the recording request and the ongoing recording request based on predefined rules. The decision undertaking module notifies outcome of the recording request to the media rendering device via the user control device. Each of the media rendering device among the plurality of media rendering devices is paired to the respective user control device among a plurality of user control devices. The media rendering device includes a display module for rendering a broadcast content. The media rendering device includes a user input module for enabling at least one of the user control device to register with a user profile. Furthermore, the media rendering device includes a handler module. The handler module performs one of initiating a recording request and responding to the notification generated by the DMS.

In accordance with another aspect of the present disclosure, a method for operating a media server to process a recording request in a network is provided. The method includes registering a plurality of user devices, receiving at least one recording request from at least one user device among the plurality of the user devices, determining at least one priority of the at least one recording request, and processing the at least one recording request based on the at least one priority.

In accordance with another aspect of the present disclosure, a media server apparatus for processing a recording request in a network is provided. The media server apparatus includes a processor configured to register a plurality of user devices, and a communicator configured to receive at least one recording request from at least one user device among the plurality of the user devices, wherein the processor is further configured to determine at least one priority of the at least one recording request and to process the at least one recording request based on the at least one priority.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described herein disclose a method and system for managing recording requests from a plurality of devices connected in a network. It is to be noted that the recording requests can be from user control devices or media rendering devices or at times from both user control devices and media rendering devices. The network is one of a home network and an internet. The user control device sends a recording request to a digital media server (DMS) for a broadcast content displayed in a media rendering device. The media rendering device is hereinafter referred to as a client device. Further, one or more client devices in the home network can send a recording request to the DMS. Furthermore, a user control device sends a recording request to the DMS over an Internet protocol (IP) network. The DMS processes a plurality of recording requests on the basis of predefined rules set by a user. The present disclosure discusses a method for managing the plurality of recording requests by the DMS. The various methods and various embodiments for managing the plurality of recording requests are explained in detail in conjunction with the description of FIGS. 1 to 13E.

Figure 1:
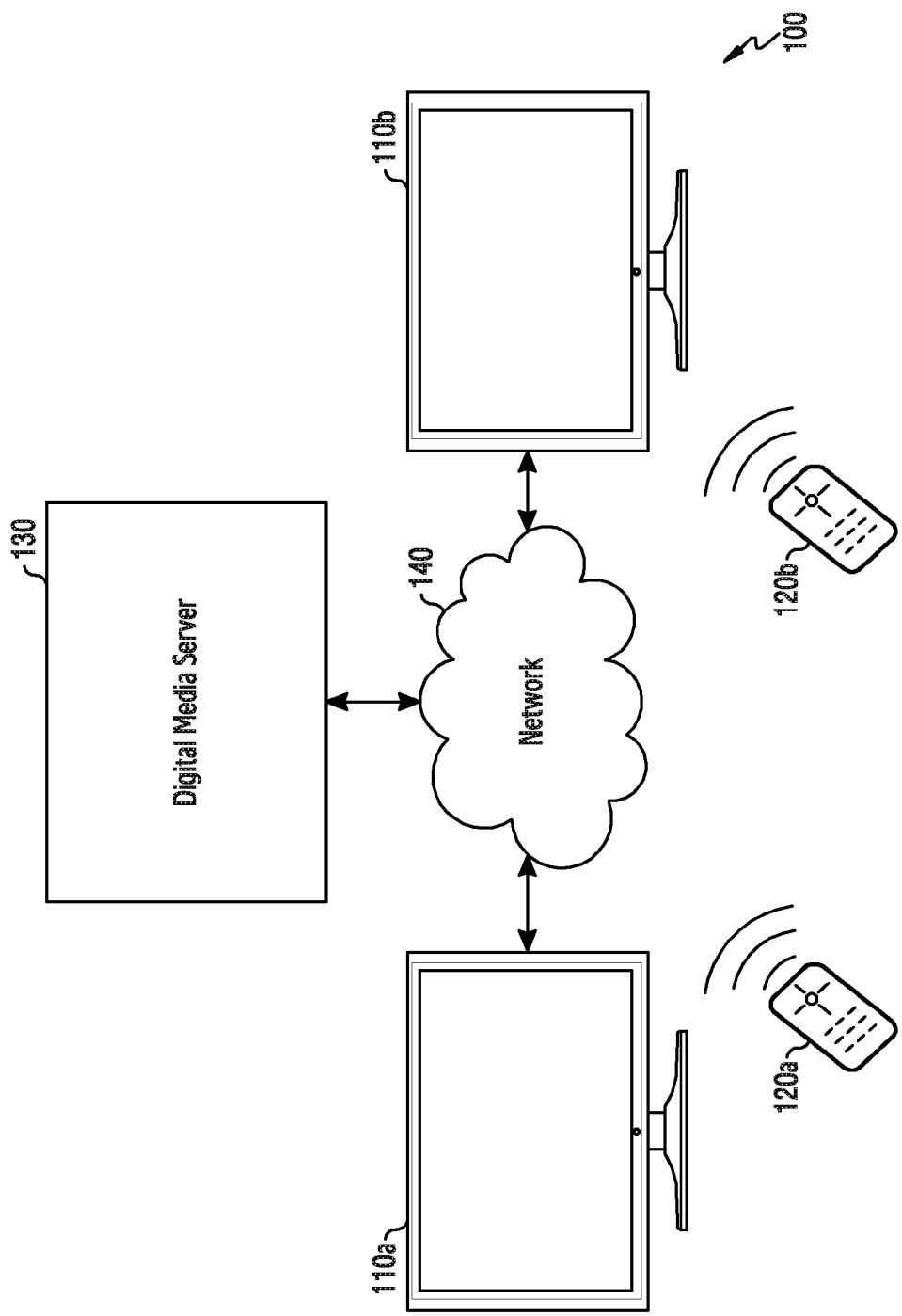
FIG. 1 illustrates a block diagram of an environment for managing multiple recording requests, according to various embodiments of the present disclosure.

FIG. 1 illustrates a block diagram of an environment 100, according to various embodiments of the present disclosure.

Referring to FIG. 1, the environment 100 includes a plurality of client devices 110a and 110b, a DMS 130, a first user control device 120a, and a second user control device 120b. Examples of the plurality of client devices 110a and 110b include but are not limited to a television (TV), a liquid crystal display (LCD) monitor, a smart TV, a personal digital assistant, a tablet, a smart phone. Although the plurality of client devices 110a and 110b are illustrated for description purposes, those skilled in the art will recognize that any number of devices may be connected in the network 140. DMS 130 receives satellite signals and searches media content by decoding the satellite signals. For example, the DMS 130 shall be a set-top box (STB) which is located in a house. For example, the DMS 130 shall be indicated as a media server.

In an embodiment of the present disclosure, the DMS 130 is a STB. The DMS 130 functions as a proxy device to facilitate selecting and receiving of broadcast content to the plurality of client devices 110a and 110b connected in the network 140. The broadcast content is used in accordance with a digital rights management license from a media content service. Each of the first user control device 120a and the second user control device 120b connects with the DMS 130 over the network 140. The network 140 is at least one of a home network, peer to peer (P2P) network and an IP network.

In one scenario, the first user control device 120a and the second user control device 120b are connected with the DMS 130 over a home network. In another scenario, the first user control device 120a and the second user control device 120b is not part of the home network. In the above mentioned scenario, at least one of the first user control device 120a and the second user control device 120b connects with the DMS 130 using Peer to Peer communication methods such as Bluetooth or Wi-Fi. In yet another scenario, the first user control device 120a and the second user control device 120b connects to the DMS 130 from a remote location. In the above mentioned scenario, each of the first user control device 120a and the second user control device 120b connects to the DMS 130 over an IP network.

The first user control device 120a generates a first user profile for a first user. Moreover, the second user control device 120b generates a second user profile for a second user. A user profile includes a user name, a media renderer identification (ID) of the client device, a profile value of the user, a preferred resolution, and user preferences. The profile value of the user is a rank assigned by a master user to each of the user. For example, the first user control device 120a is a master user control device. The master user control device 120a is operated by the master user. The master user assigns profile value to the first user and the second user. The creation of user profile is further illustrated in FIG. 2.

The plurality of the client devices 110a and 110b registers with the DMS 130. On registration with the DMS 130, the plurality of the client devices 110a and 110b stores at least one of a device ID, device name and a unique identification tag in a DMS database. The first user control device 120a and the second user control device 120b are installed with a control application. The control application enables the first user control device 120a and the second user control device 120b to generate a user interface for controlling each of the plurality of client device 110a and 110b, and transmitting commands to the DMS 130.

A user control device can pair with a client device. However, it is not necessary for the user control device to pair with the client device. The user control device can directly register with the DMS and send recording requests. The pairing of the user control device with the client device authenticates the user control device to represent the client device at the DMS 130. In a method of pairing, the first user control device 120a sends a pairing request to the client device using the control application stored in the first user control device 120a. On receiving the pairing request from the first user control device 120a, the client device 110a shares at least one of the device ID, device name and a unique identification tag with the first user control device 120a. Further, the first user control device 120a sends a registration request to the DMS. By sending the registration request, the first user control device 120a provides at least one of the device id, device name and a unique identification tag to the DMS 130. The DMS 130 authenticates the first user control device 120a for representing the client device 110a in future communications.

In another method of pairing, the second user control device 120b sends a registration request directly to the DMS 130. Further, the second user control device 120b provides the DMS 130 with at least one of a device ID, device name and a unique identification tag of the client device 110b. The DMS 130 in turn sends a one time password (OTP) to the client device 110b. The second user control device enters the OTP. On the successful verification of the OTP entered by the second user control device 120b, the DMS 130 authorizes the second user control device to represent the client device 110b. For example, if the user control device is a tablet, the tablet functions as a client device as well as a user control device. Therefore, in the example, the tablet directly registers with the DMS to initiate further communication.

The first user control device 120a receives an acknowledgement for the registration request from the DMS 110. The first user operates the first user control device 120a to transmit a first recording request to the DMS 130. The first recording request instructs the DMS 130 to record a broadcast content requested by the first user control device 120a. The DMS 130 forwards the first recording request to a service queue in the DMS 130. If the service queue is empty, the DMS 130 processes the first recording request.

The second user operates the second user control device 120b to transmit a second recording request to the DMS 130. The DMS 130 forwards the second recording request to the service queue. In a scenario where the service queue is lined with the first recording request from the first user control device 120a, the DMS 130 compares the profile value of the first user as stored in the first user profile with the profile value of the second user as stored in the second user profile. If the profile value of the first user is higher than the profile value of the second user, the DMS 130 processes the first recording request prior to processing the second recording request. If the profile value of the first user is lesser than the profile value of the second user, the DMS 130 processes the second recording request before processing the first recording request.

Processing of at least one of the first recording request and the second recording request by the DMS 130 includes notifying at least one of the first user control device 120a and the second user control device 120b the availability of the requested content in the database. Further, processing includes sending at least one of acceptance and rejection notification to at least one of the first user control device 120a and second user control device 120b in response to the respective recording requests. Moreover, processing includes seeking approval from the first user control device 120a for processing the second recording request of the second user control device 120b. Furthermore, processing includes disabling the first recording request temporarily and resumes the processing of the first recording request on analyzing the first recording request based on predefined rules.

In an embodiment of the present disclosure, the first user control device 120a is a portable user control device. The portable user control device is at least one of a laptop, a smartphone, a personal digital assistant, and a tablet. In a scenario where the first user wishes to record a broadcast content from a remote location, the first user connects to the DMS 130 using the first user control device 120a. Further, the first user sends a recording request to the DMS 130 using the first user control device 120a. The communication between the first user control device 120a and the DMS 130 is established over at least one of an internet protocol network, a telephony based network, and a satellite based network. Moreover, the first user control device 120a is capable of rendering broadcast content to the first user.

Figure 2:
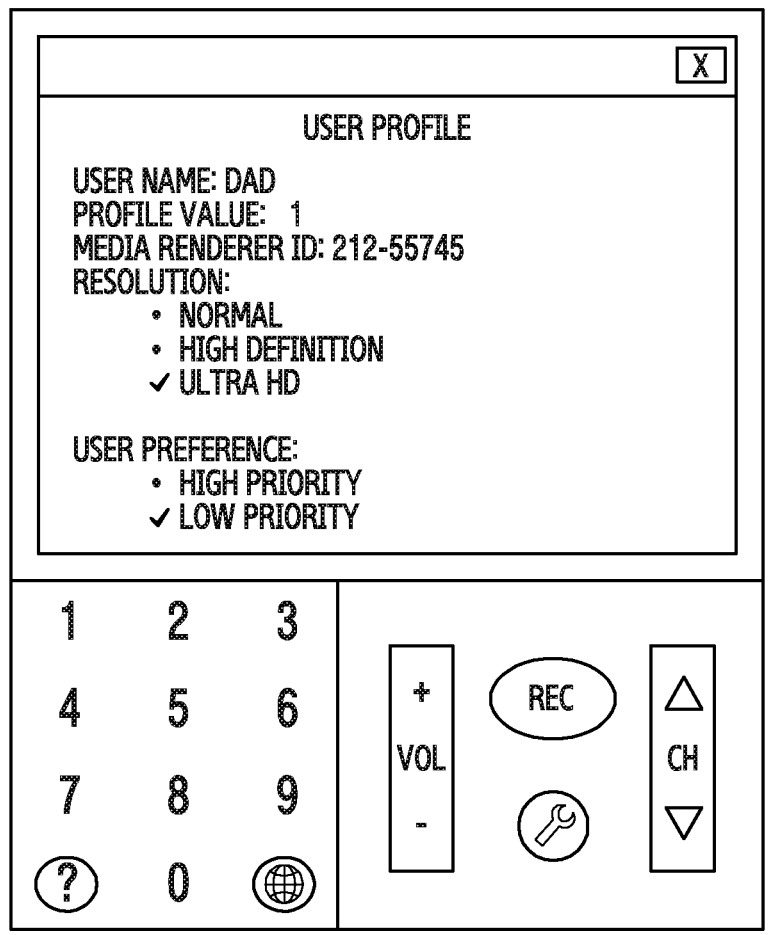
FIG. 2 is an illustration of a user profile for a user in a user control device, according to an embodiment of the present disclosure.

FIG. 2 is an illustration of contents of a user profile for a user in a user control device according to an embodiment of the present disclosure.

Referring to FIG. 2, the user profile consists of a user name, a media renderer ID, a profile value, a preferred resolution, and user preferences. The resolution can be one of a normal resolution, high definition resolution, and an ultra-high definition resolution. A user profile is created for each user using a control application installed in the user control device. Further, a user control device stores the user profile in a DMS database. A user can sign in to control application in the user control device by entering the user name and a password. The corresponding user profile is mapped to the user. Now, the user sends a recording request to the DMS using the user control device. Further, the DMS parses the recording request along with the user profile corresponding to the user. Further, the DMS prioritizes the recording request in accordance with the profile value of the user. The profile value of the user is a rank assigned by a master user to each of the user. For example, if the profile value of a first user is higher than a profile value of a second user, the DMS prioritizes a recording request from the first user. Similarly, the DMS records a broadcast content with the resolution as specified by the user in the user profile.

Communication between the user control device and the DMS is enabled by a variety of wireless methodologies, including at least one of Institute of Electrical and Electronic Engineers (IEEE), third generation (3G), fourth generation (4G), Enhanced Data for Global Evolution (Edge), Wi-Fi, ZigBee, near field communications (NFC), and Bluetooth. In a scenario, if direct communication between the user control device and DMS is not possible, the communication between the user control device and the DMS is made through indirect communication protocols. Indirect communication protocols include a proxy service used to route messages from the user control device to the DMS by at least one of Internet and Ethernet.

Figure 3:
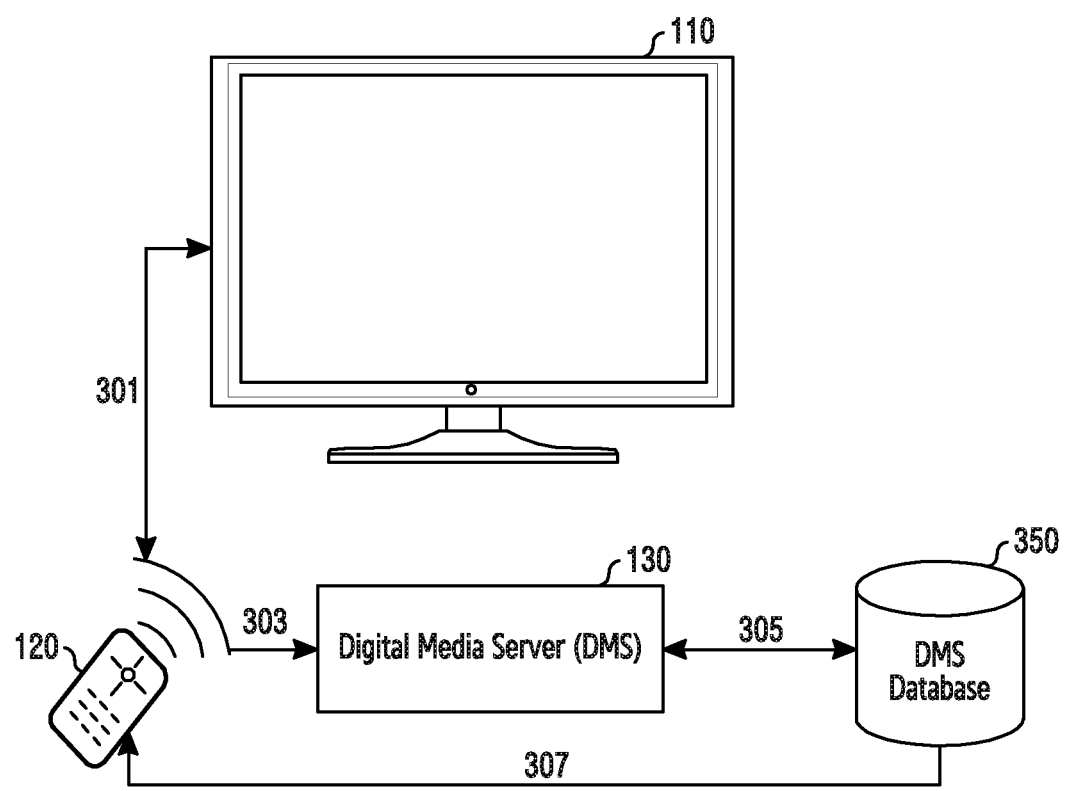
FIG. 3 illustrates a block diagram of system for processing a recording request for a broadcast content available in a digital media server (DMS) database, from a user control device, according to an embodiment of the present disclosure.

FIG. 3 is an illustration of a system for processing a recording request for a broadcast content available in a DMS database according to an embodiment of the present disclosure.

Referring to FIG. 3, the system includes a client device 110, a DMS 130, a DMS database 350, a user control device 120. Examples of the client device 110 include but are not limited to a TV, an LCD monitor, a smart TV, a personal digital assistant, a tablet, a smart phone.

In an embodiment of the present disclosure, the DMS 130 is a STB. The user control device 120 and the DMS 130 communicate with each other in a network. The network is at least one of a home network, peer to peer network and an IP network. For example, the user control device 120 communicates with the DMS 130 over the home network when the user control device 120 and the DMS 130 are in close proximity. In an embodiment of the present disclosure, the user control device 120 communicates with the DMS 130 over the IP network from a remote location.

The user control device 120 is installed with a control application to enable a user to perform one of creating a user profile, controlling the client device 110, and communicating with the DMS 130. The user control device 120 generates a user profile for a user. The user profile consists of at least one of a media renderer ID, a profile value, a preferred resolution, and user preferences. The user preferences include information regarding priority levels assigned to the broadcast content by a user. The DMS 130 assigns user preferences on the basis of one of comparison of the profile value among a plurality of user profiles, and availability of broadcast content in the preferred resolution. In an embodiment of the present disclosure, the DMS 130 assigns at least one of a high priority level and a low priority level for the broadcast content. The DMS 130 assigns low priority to the broadcast content if the broadcast content type is a repetitive broadcast content. Further, the DMS 130 assigns high priority to the broadcast content if the broadcast content is to be broadcasted for a single time.

The DMS 130 stores the user profile in the DMS database 350. The DMS 130 uses the user profile for decision making and future references. Further, the DMS 130 updates a list of connected client devices and paired user control device continuously.

In an embodiment of the present disclosure, the requested broadcast content is available in the DMS database 350. The operations in which the recording request for the broadcast content is processed is as follows.

The client device 110 is paired to the user control device 120, depicted as operation 301 in FIG. 3. The user control device 120 registers with the DMS 130.

The user control device 120 registers with the DMS 130, and initiates the recording request for the broadcast content to the DMS 130, collectively depicted as operation 303 in FIG. 3.

The DMS 130 checks the DMS database 350 for the requested broadcast content. Further, the DMS database 350 notifies the search result to the DMS 130, as depicted in operation 305 in FIG. 3.

The DMS database 350 notifies the user control device 120 the availability of the requested broadcast content in the DMS database 350, as depicted in operation 307 in FIG. 3.

The user operates the user control device 120 to send a registration request to the DMS 130. The user control device 120 receives an acknowledgment for the registration request from the DMS 130. Further, the user uses the user control device 120 for initiating a recording request to the DMS 130. On receiving the recording request, the DMS 130 extracts a metadata of the recording request. The metadata of the recording request includes program name, channel name, genre and user profile information. The metadata of the recording request allows the DMS 130 to identify the requested broadcast content to be recorded in the record request.

Further, the DMS 130 analyses the recording request on the basis of predefined rules. The predefined rules includes at least one of:
  check a DMS database for existing recordings,
  continue an ongoing recording request of a broadcast content if the recording request is for the same broadcast content,
  check the availability of the requested broadcast content at another instance of time,
  check for requested broadcast content of a preferred resolution,
  record a requested broadcast content with normal resolution in the absence of the preferred resolution, and
  check the availability of the requested broadcast content in a world wide web (www).

On the basis of the predefined rules, the DMS 130 performs a check in the DMS database 350 for the requested broadcast content. The DMS 130 identifies the requested broadcast content from the metadata of the recording request. The DMS 130 scans through stored broadcast contents available in the DMS database 350. In a scenario where the requested broadcast content is not available in the DMS database 350, the DMS 130 is notified. The DMS 130 further forwards the recording request to a service queue.

In another scenario where the requested broadcast content is available in the DMS database 350, the DMS 130 sends a message to the user control device 120 informing the availability of the requested broadcast content in the DMS database 350. In an example, the requested broadcast content available in the DMS database 350 is of ultra high definition (UHD) resolution. However, the user preference specified in the user profile is high definition (HD) resolution. In such cases, the DMS 130 sends a message to the user control device 120 seeking approval from the user control device 120. A user responds to the message sent by the DMS database 350 to the user control device 120. A user can accept the broadcast content of UHD available in the DMS. Further, the user can send a re-recording request for the broadcast content in HD resolution as preferred by the user.

Figure 4:
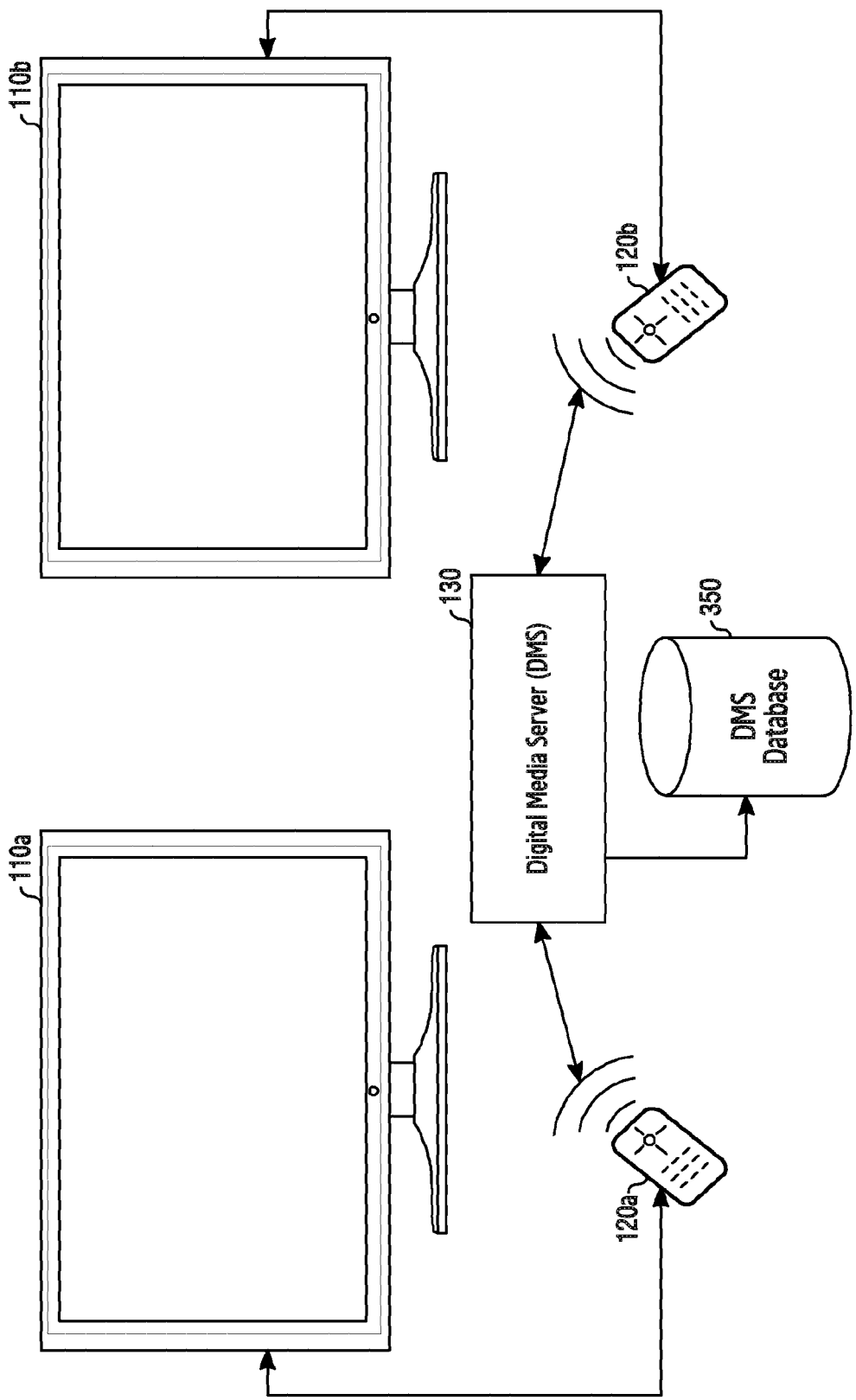
FIG. 4 illustrates block diagram of a system for processing a recording request from a plurality of user control devices, on the basis of a profile value, according to another embodiment of the present disclosure.

FIG. 4 is an illustration of a system for processing a recording request for the broadcast content from a plurality of user control devices on the basis of a profile value according to an embodiment of the present disclosure.

Referring to FIG. 4, the system includes a first client device 110*a*, a second client device 110*b*, a DMS 130, a DMS database 350, a first user control device 120*a*, and a second user control device 120*b*. In an embodiment of the present disclosure, the DMS 130 is a STB. The first user control device 120*a*, the second user control device 120*b*, and the DMS 130 are connected to each other in a network. The network is at least one of a home network, peer to peer network and an IP network.

The first user control device 120*a* and the second user control device 120*b* is installed with a control application to enable a user to perform one of creating a user profile, controlling the client devices, and communicating with the DMS 130. The first user control device 120*a* generates a first user profile for a first user. A user profile of a user control device consists of a user name, media renderer ID of the client device, a profile value of the user, a preferred resolution, and user preferences. The profile value of a user profile is a value assigned by a master user to each of the first user and the second user.

The first user uses the first user control device 120*a* to send a registration request to the DMS 130. The first user control device 120*a* receives an acknowledgement for the registration request from the DMS 130. Further, the first user operates the first user control device 120*a* to initiate a first recording request to the DMS 130. The DMS 130 extracts and analyses metadata of the first recording request. The DMS 130 initially adds the first recording request to a service queue. In case the service queue has no ongoing recording request, the first recording request is processed. In a scenario where the service queue is lined with an ongoing recording request, the DMS 130 decides the next course of action in accordance with data stored in the first user profile, resource availability, network bandwidth, memory availability and predefined rules.

Similarly, the second user control device 120*b* pairs with at least one of the first client device 120*a* and the second client device 120*b*. The second control device 120*b* generates a second user profile for a second user. The second user operates the second user control device 120*b* to send a registration request to the DMS 130. The second user control device 120*b* receives an acknowledgment for the registration request from the DMS 130.

Further, the second user makes use of the second user control device 120*b* to initiate a second recording request to the DMS 130. The DMS 130 extracts and analyses metadata of the second recording request. The DMS 130 initially adds the first recording request to the service queue. However, the service queue is lined up with the first recording request from the first user control device 120*a*. Further, the DMS 130 analyses the second recording request on the basis of predefined rules. Based on the predefined rules, the DMS 130 compares the profile value of the second user with the profile value of the first user. If the profile value of the first user is greater than a profile value of the second user, the DMS 130 notifies the second user control device 120*b*, the inability of the DMS 130 to process the recording request sent by the second user control device 120*b*.

In an embodiment of the present disclosure, the DMS 130 parses an Electronic Program guide to check availability of the requested broadcast content at a later time. Furthermore, the DMS 130 sends an approval message to a user control device among the plurality of user control devices 120*a* and 120*b* seeking permission to process the second recording request at a later point of time.

In yet another embodiment of the present disclosure the DMS 130 assigns user preferences for a recording request on the basis of the predefined rules. The user preferences include information regarding priority levels of user profiles, recording requests, and broadcast contents. The DMS 130 assigns a high priority for a user profile with a higher profile value in comparison to a plurality of user profiles. Further, the DMS 130 assigns a low priority to a recording request having repeated broadcast, assigns a high priority on availability of user preferred resolution, and assigns a high preference to a recording request of higher priority. For example, a recording request with a high profile value is given preference over a recording request with a low profile value. However, if the requested broadcast content with a high profile value has repeated broadcast, the DMS 130 assigns a low priority to the recording request.

Figure 5:
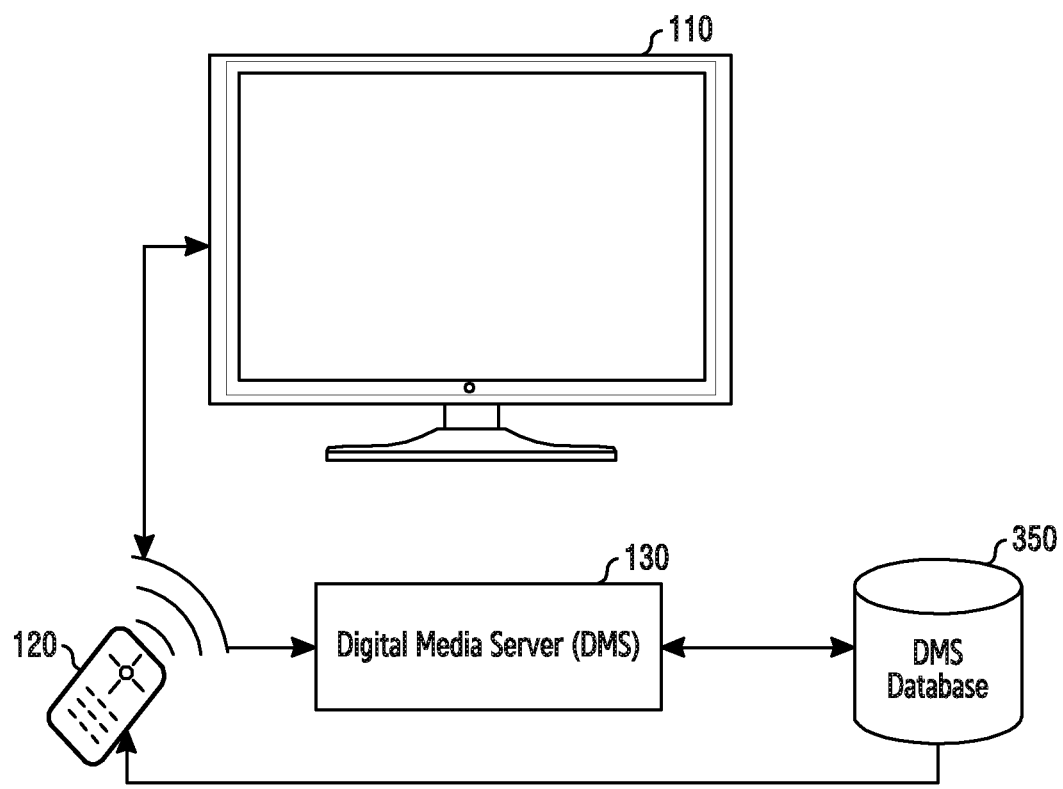
FIG. 5 illustrates block diagram of a system for processing the recording request for the broadcast content in a preferred resolution from the user control device, according to another embodiment of the present disclosure.

FIG. 5 is an illustration of a system for processing a recording request for a broadcast content in a preferred resolution, according to an embodiment of the present disclosure.

Referring to FIG. 5, the system includes a client device 110, a DMS 130, a DMS database 350, and a user control device 120. The user control device 120 and the DMS 130 communicate with each other in a network. The network is at least one of a home network and an IP network. In an embodiment of the present disclosure, the DMS 130 is a STB.

The user control device 120 is paired to the client device 110. The user control device 120 generates a user profile for a user. Further, the DMS 130 stores the user profile in the DMS database 350. The user profile is used by the DMS 130 for decision making and future references. Further, the DMS 130 updates a list of client devices and user control devices paired to the client devices continuously. The user operates the user control device 120 to send a registration request to the DMS 130.

The user control device 120 receives an acknowledgement for the registration request from the DMS 130. Further, the user initiates a recording request to the DMS 130 using the user control device 120. The DMS 130 extracts and analyses metadata of the recording request. Further, the DMS 130 analyses the recording request on the basis of predefined rules. The DMS 130 parses the user profile of the user control device 120 for information regarding the choice of resolution. Moreover, the DMS 130 parses an electronic program guide (EPG) to check availability of the broadcast content with the preferred resolution.

The DMS 130 notifies the user control device 120 of at least one of availability and non-availability of the requested broadcast content in the preferred resolution. In an embodiment of the present disclosure, if the requested broadcast content is not available as per the resolution preferred in the user profile, the DMS 130 adds the recording request to a service queue. If the service queue is empty, the recording request is processed.

In another embodiment of the present disclosure, the DMS 130 seeks an approval from the user control device 120 if the requested broadcast content is available as per the resolution available preferred in the user profile. For example, the user control device 120 initiates the recording request for a broadcast content in UHD resolution to the DMS 130. Further, the DMS 130 parses the EPG, made available to the DMS 130 by the broadcaster, for the requested broadcast content of the preferred resolution. The DMS 130 checks for the availability of the requested broadcast content as per the resolution specified in the user profile. If the requested broadcast content is available in the specified resolution, the DMS 130 seeks an approval from the user control device 120.

Figure 6:
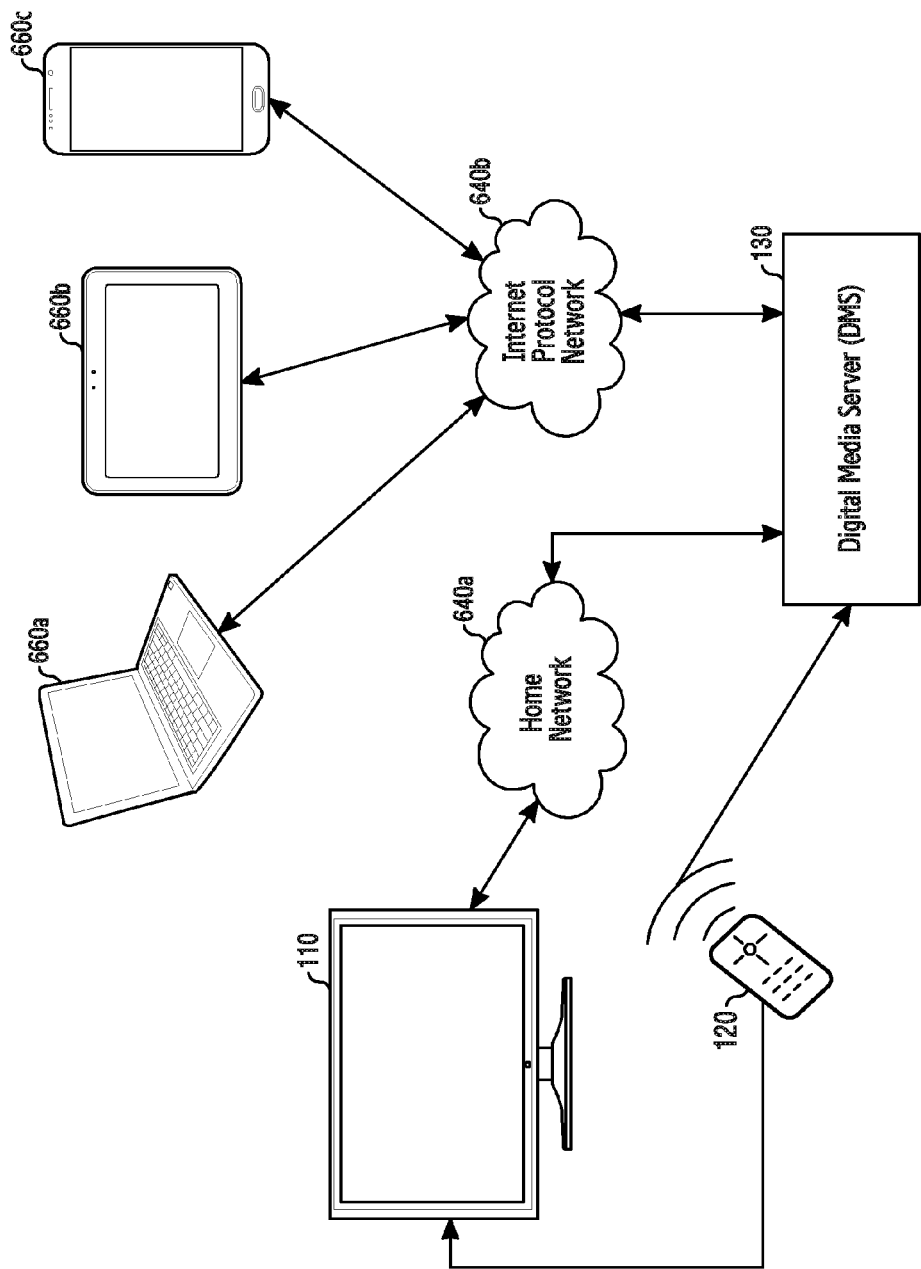
FIG. 6 is an illustration of a system managing multiple recording requests for the broadcast content, according to an embodiment of the present disclosure.

FIG. 6 is an illustration of a system for managing multiple recording requests, according to an embodiment of the present disclosure.

Referring to FIG. 6, the system includes a client device 110, a first user control device 660*a*, a second user control device 660*b*, a third user control device 660*c*, a DMS 130, and a master user control device 120. The master user control device 120 pairs with the client device 110. The master user control device 120 creates a user profile for a master user. The master user control device 120 registers with the DMS 130 over a home network 640*a*. The first user control device 660*a*, the second user control device 660*b*, the third user control device 660*c* are installed with a control application to enable users to perform one of creation of a user profile, and communicate with the DMS 130. Examples of the first user control device 660*a*, the second user control device 660*b*, the third user control device 660*c* includes but is not limited to smartphone, personal digital assistant, laptop, and tablet computer.

The first user control device 660*a* creates a first user profile for a first user. The first user control device 660*a* registers with the DMS 130 over an IP network 640*b* Similarly, the second user control device 660*b* creates a second user profile for a second user. The second user control device 660*b* registers with the DMS 130 over the IP network 640*b* Similarly, the third user control device 660*c* creates a third user profile for a third user. The third user control device 660*c* registers with the DMS 130 over the IP network 640*b*.

In an embodiment of the disclosure, a master user uses the master user control device 120 to assign profile value for each of a plurality of users accessing the DMS 130. For example, the master user control device 120 sets a profile value "1" for the master user. Further, the master user control device 120 sets a profile value "2" for the first user, a profile value "3" for the second user and a profile value "3" for the third user. Further, the master user control device 120 is provided with an option to edit the profile value assigned to the plurality of users at any given time. Further, the master user control device 120 can create predefined rules. The predefined rules are used by the DMS 130 for processing the recording request.

The DMS 130 receives a first recording request from the master user control device 120 for a first broadcast content in a normal resolution. The DMS 130 extracts and analyses metadata of the first recording request. The DMS 130 decides the next course of action in accordance with data stored in a user profile of the master user, resource availability, network bandwidth, memory availability and predefined rules. The DMS 130 initially adds the first recording request to a service queue. Since the service queue has no ongoing recording request, the first recording request is processed.

Further, the DMS 130 receives a second recording request from a first user control device 660*a* for a second broadcast content in a normal resolution. The first user sends the second recording request over the IP network 640*b*. The DMS 130 extracts and analyses metadata of the second recording request. Further, the DMS 130 analyses the second recording request on the basis of data stored in the first user profile, resource availability, network bandwidth, memory availability and predefined rules. Based on the predefined rules, the DMS 130 compares the profile value of master user with the profile value of the first user. Now, referring to the example, the profile value of the master user is greater than a profile value of the first user. Hence, the DMS 130 adds the second recording request to the service queue.

Further, the DMS 130 receives a third recording request from the second user control device 660*b* for a third broadcast content in a high definition resolution. The DMS 130 extracts and analyses metadata of the third recording request. Further, the DMS 660 analyses the third recording request on the basis of data stored in the second user profile, resource availability, network bandwidth, memory availability and predefined rules. Based on the predefined rules, the DMS 130 compares the profile value of the second user with the profile value of the first user and master user. Now, referring to the example, the profile value of the master user and the first user is greater than a profile value of the second user. Hence, the DMS 130 adds the third recording request to the service queue.

Further, the DMS 130 receives a fourth recording request from the third user control device over the IP network 640. The DMS 130 extracts and analyses metadata of the fourth recording request. Further, the DMS 130 analyses the fourth recording request on the basis of data stored in the third user profile, resource availability, network bandwidth, memory availability and predefined rules. Based on the predefined rules, the DMS 130 compares the third profile value, the first profile value, and the second profile value. Now, referring to the example, the DMS 130 detects a similarity in the second profile value and the third profile value. In the above mentioned case, the DMS 130 parses an Electronic Program Guide to check availability of the broadcast content in a preferred resolution requested by at least one of the second user and the third user at a later time. In a scenario, the broadcast content in a preferred resolution, as requested by the third user is not available later. Thus, the DMS 130 gives higher priority to the fourth recording request from the third user control device 660*c*. Further, the DMS 130 notifies the second user control device 660*b* of a delay in processing the third recording request.

Figure 7:
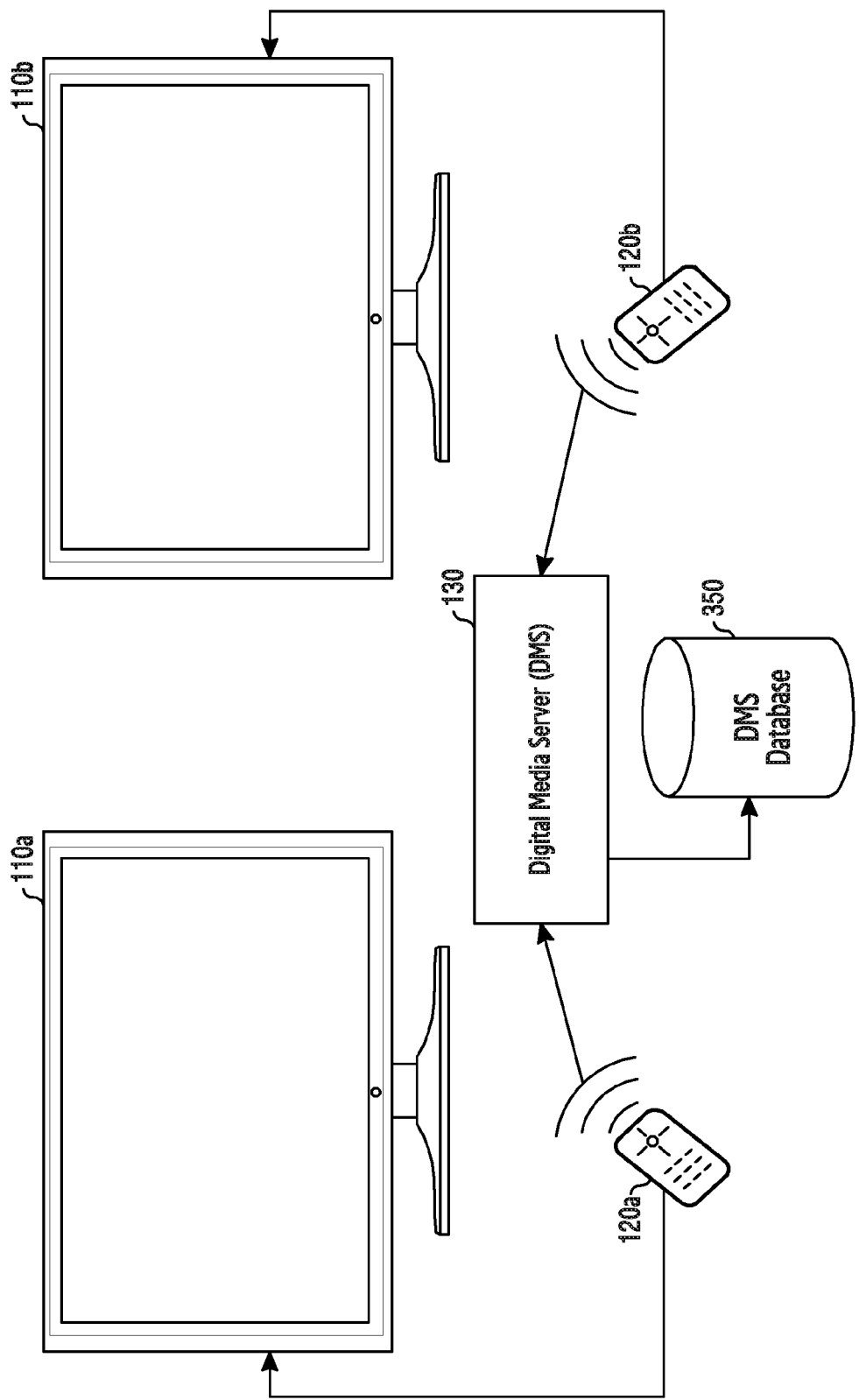
FIG. 7 illustrates a system for processing the recording request for similar broadcast content from the plurality of user control devices, according to an embodiment of the present disclosure.

FIG. 7 is an illustration of a system for processing multiple recording requests for a same broadcast content from a plurality of user control devices according to an embodiment of the present disclosure.

Referring to FIG. 7, the system includes a first client device 110*a*, a second client device 110*b*, a DMS 130, a DMS database 350, a first user control device 120*a*, and a second user control device 120*b*. The first user control device 120*a*, the second user control device 120*b*, and the DMS 130 communicate with each other in a network. The network is at least one of a home network and an IP network. In an embodiment of the present disclosure, the DMS 130 is a STB.

The first user control device 120*a* generates a first user profile for a first user. The first user control device 120*a* stores the first user profile in the DMS 130. The first user control device 120*a* registers with the DMS 130 to represent the first client device 110*a*. The first user operates the first user control device 120*a* to send a registration request to the DMS 130. Further, the first user control device 120*a* receives an acknowledgement for the registration request from the DMS 130.

Similarly, the second user control device 120*b* registers with the DMS 130 to represent the second client device 110*b*. The second user control device 120*b* generates a second user profile for a second user. The second user control device 120*b* stores the second user profile in the DMS 130. The first user operates the second user control device 120*b* to send a registration request to the DMS 130. Further, the second user control device 120*b* receives an acknowledgement for the registration request from the DMS 130.

The first user operates on the first user control device 120*a* to initiate a first recording request to the DMS 130. The DMS 130 extracts the metadata of the first recording request. Further, the DMS 130 analyses the first recording request on the basis of predefined rules. The DMS 130 decides the next course of action based on the profile value and predefined rules. The DMS 130 initially forwards the first recording request to a service queue. If the service queue is empty, the first recording request is processed. If the service queue is stacked with an ongoing recording request, the DMS 130 decides the next course of action in accordance with data stored in the first user profile, resource availability, network bandwidth, memory availability and predefined rules.

Further, the second user operates the second user control device 120*b* to initiate a second recording request for a broadcast content to the DMS 130. The DMS 130 extracts metadata of the second recording request. Further, the DMS 130 analyses the metadata of the second recording request. On analyzing the metadata of the second recording request, the DMS 130 identifies the broadcast content of second recording request to be the same as the broadcast content of first recording request.

In an embodiment of the present disclosure, the DMS 130 receives the first recording request from the first user control device 120*a* at a time "t". The DMS 130 begins the processing of the first recording request. Further, the DMS 130 receives the second recording request from the second user control device 120*b* at a time "t+n". The DMS 130 notifies the second user control device 120*b* of a recording request being processed for the same broadcast content. Further, the DMS 130 temporarily disables the second recording requests received from the second user control device 120*b*.

In another embodiment of the present disclosure, the DMS 130 receives recording request simultaneously from the first user control device 120*a* and the second user control device 120*b* for the same broadcast content. In the above mentioned scenario, the DMS 130 compares the profile value of the first user with the profile value of the second user. Further, the DMS 130 notifies a user with lower profile value of a recording request being initiated for the same broadcast content. Furthermore, the DMS 130 disables the recording request from the user with least profile value.

Various communication protocols are used to implement content recording management in home network architecture, without requiring the use of a dedicated DMS for each client device. The communication protocols include remote view (RVU), digital living network alliance (DLNA) hyper text markup language 5 (HTML5) remote user interface (RUI), and IP. The DLNA HTML5 RUI permits the operators to develop a "write once, play anywhere" codebase in a DMS. The code base is accessed by a plurality of devices connected in the home network. The code base in the DLNA HTML5 RUI protocol allows reduced development costs and a provision for a unique UI for every device in the home network. The method of communication implemented using RVU protocol is further illustrated in FIG. 8.

Figure 8:
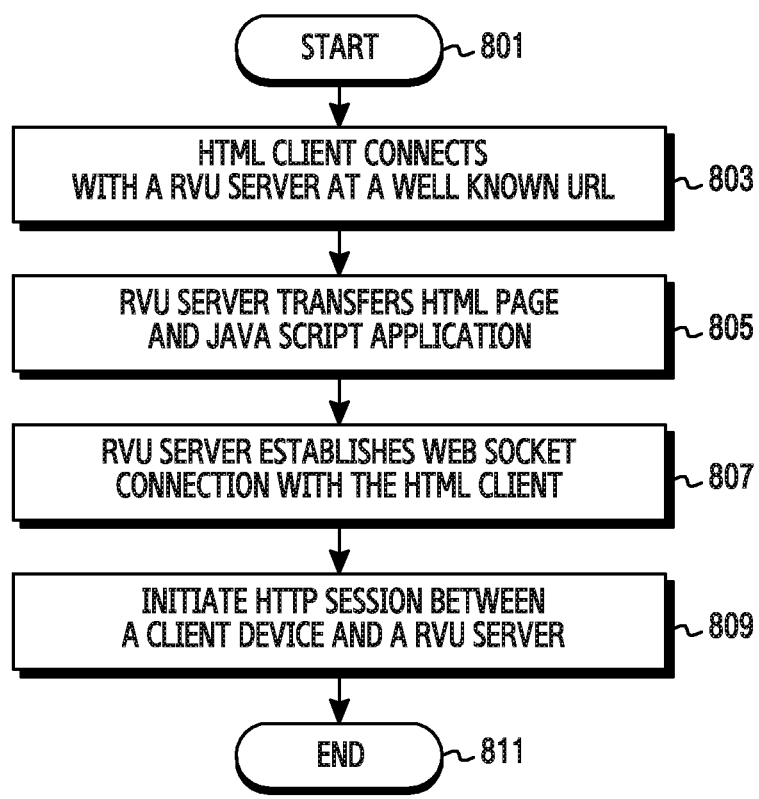
FIG. 8 is a flowchart illustrating a method for initiating a session between a remote view (RVU) server within a DMS and a hyper text markup language (HTML) client of a client device, according to an embodiment of the present disclosure.

FIG. 8 is a flowchart illustrating a method for initiating a session between a RVU server within a DMS and a HTML client of a client device, according to an embodiment of the present disclosure. The flowchart begins at operation 801.

Referring to FIG. 8, at operation 803, the HTML client of the client device connects with the RVU server within a DMS at a mutually known uniform resource locator (URL). In an embodiment of the present disclosure, the DMS is a STB.

At operation 805, the RVU server transfers an HTML page to the client device along with a java script application. Further, the HTML client runs the java script application.

At operation 807, the RVU server within the DMS establishes a web socket connection with the HTML client of the client device. The DMS defines an interface and protocol between the DMS and web socket.

At operation 809, the RVU server initiates a hyper text transfer protocol (HTTP) session with the HTML client of the client device. The HTML client is further paired to a user control device. The flowchart ends at operation 811.

Figure 9:
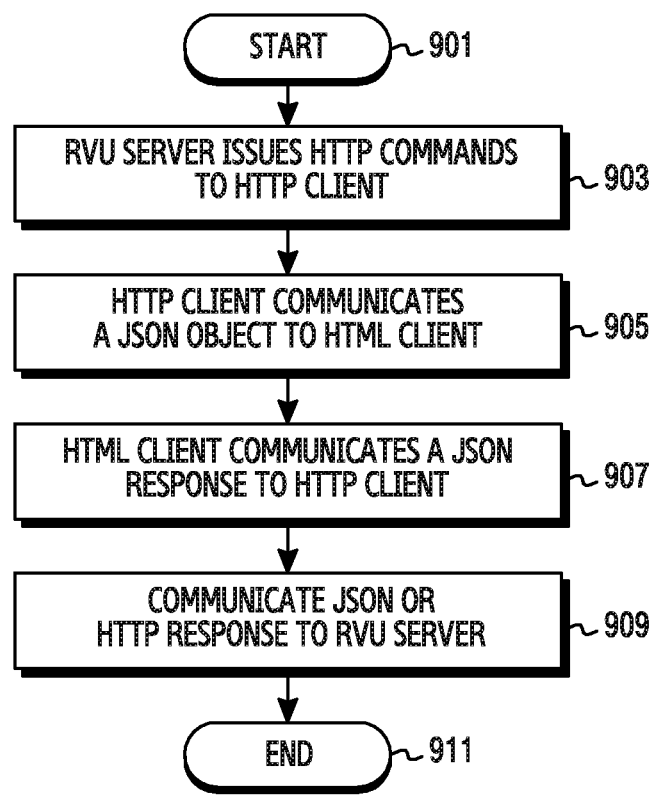
FIG. 9 is a flowchart illustrating a method for communicating between the user control device and a DMS, according to an embodiment of the present disclosure.

FIG. 9 is a flowchart illustrating a method for communicating between a user control device and a DMS, according to an embodiment of the present disclosure. A process illustrated by the flowchart begins at operation 901.

Referring to FIG. 9, at operation 903, an RVU server within the DMS issues HTTP commands to a HTTP client. The HTTP client is executed in the user control device for communicating with the DMS. The user control device is paired to a client device. Further, the HTTP client repackages the RVU commands as a java script object notation (JSON) object.

At operation 905, the HTTP client running in the user control device communicates the JSON object to the HTML client of the client device. The client device implements a JSON parser to extract information from the JSON object. Further, the client device displays the information extracted from the JSON object by means of at least one of pop up's or graphical user interface available in the client device.

At operation 907, a JSON response is communicated to the HTTP client running in the user control device. Further, the HTTP client translates the JSON response into a HTTP response.

At operation 909, the HTTP client in the user control device sends JSON or HTTP responses to the RVU server within the DMS. The flowchart ends at operation 911.

Figure 10:
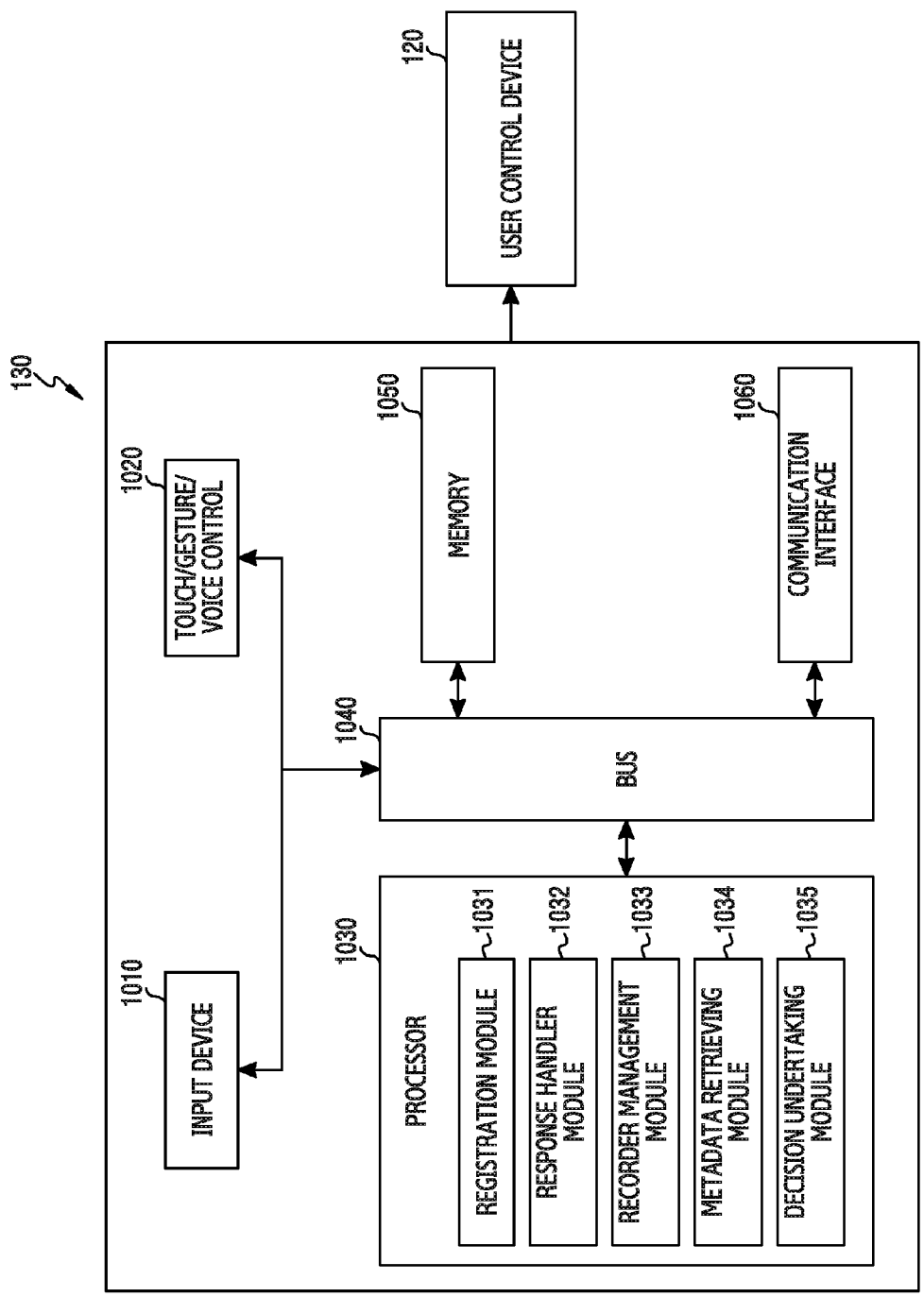
FIG. 10 illustrates a block diagram of the DMS, according to an embodiment of the present disclosure.

FIG. 10 is a block diagram of a DMS 130, according to an embodiment of the present disclosure.

Referring to FIG. 10, the DMS 130 is coupled to a user control device 120. In an embodiment of the present disclosure, the DMS 130 is a STB. The DMS 130 includes at least one of a bus 1040 and other communication mechanism for communicating information. The DMS 130 includes a processor 1030 coupled with the bus 1040. The processor 1030 includes an integrated electronic circuit for processing and controlling functionalities of the DMS 130. The processor 1030 includes a registration module 1031, a response handler module 1032, a recorder management module 1033, a metadata retrieving module 1034, and a decision undertaking module 1035 for managing the plurality of recording request in the DMS 130.

Further, the DMS 130 includes a memory 1050, such as a random access memory (RAM) or other dynamic storage device, coupled to the bus 1040 for storing information to be used by the processor 1030. The memory 1050 is used for storing any temporary information required.

Various embodiments are related to the use of the DMS 130 for implementing the techniques described herein. In an embodiment of the present disclosure, the techniques are performed by the processor 1030 using information included in the memory 1050. The information is read into the memory 1050 from another non-transitory machine-readable medium, such as a storage unit. The instructions are stored in the memory 1050.

The term "machine-readable medium" as used herein refers to a non-transitory medium that participates in providing data that causes a machine to operate in a specific fashion. In an embodiment of the present disclosure, implemented using the DMS 130, various non-transitory machine-readable medium are involved, for example, in providing information to the processor 1030. The non-transitory machine-readable medium can be a storage media. Storage media includes both non-volatile media and volatile media. Non-volatile media includes, for example, optical or magnetic disks, such as the storage unit. Volatile media includes dynamic memory, such as the memory 1050. All such media must be tangible to enable the information carried by the media to be detected by a physical mechanism that reads the information into a machine.

Common forms of non-transitory machine-readable medium include, for example, a floppy disk, a flexible disk, hard disk, magnetic tape, or any other magnetic medium, a compact disc read-only memory (CD-ROM), any other optical medium, punch cards, paper tape, any other physical medium with patterns of holes, a RAM, a programmable ROM (PROM), an erasable programmable ROM (EPROM), a FLASH-EPROM, any other memory chip or cartridge. The DMS 130 also includes a communication interface 1060 coupled to the bus 1040. The communication interface 1031 provides a two-way data communication and coupling to a user control device 120.

An input device 1010, including alphanumeric and other keys, is coupled to the bus 1040 for receiving an input from a user. Another type of user input device is a touch, gesture, or voice control 1020, such as a swipe, pattern, remote control device, a touch pad, a gesture, voice, touch ball, attentive user interfaces, text based interfaces, and a mouse and cursor direction keys for communicating the input to the processor 1030.

The registration module 1031 enables the user control device 120 to register with the DMS 130. Further, the response handler module 1032 in the DMS 130 receives the recording request initiated by a user control device 120. The recorder management module 1033 identifies at least one of new recording request and the ongoing recording request processed in the DMS 130. The metadata retrieving module 1034 extracts metadata of at least one of the new recording request and the ongoing recording request. The decision undertaking module 1035 analyzes the metadata of at least one of the new recording request and the ongoing recording request based on predefined rules. Further, the decision undertaking module 1035 notifies an outcome of the recording request to the user control device 120. The outcome sent by the DMS 130 is a notification to intimating a user of one of processing the recording request by the DMS 130. Further, the notification includes an approval message and rejection message. The DMS 130 sends an approval message when the requested broadcast content can be processed instantly or at a later time. The DMS 130 sends a rejection message when the DMS 130 fails to process the recording request. The communication interface 1060 shall be indicated as a communicator. The communicator receives at least one recording request from at least one user control device of a plurality of user control devices. The user control device shall be indicated as a user device. The communicator notifies obtainability of broadcasting content associated with the recording request based on a preferred resolution to a user device. The communicator receives a response for the notifying of the obtainability from the user device.

The processor 1030 registers a plurality of user devices. The processor 1030 determines a priority of a recording request and processes the recording request in accordance with the priority. The processor 1030 determines a user preference by comparing a profile value of a user device with a profile value of other user device or by confirming the obtainability of broadcasting content in preferred resolution. The processor 1030 confirms existing recordings in a DMS database. The existing recordings have been performed by the DMS 130. The processor 1030 confirms ongoing recording in a database. The processor 1030 performs an ongoing recording request when broadcasting content associated with a recording request is equal to broadcasting content associated with the ongoing recording. The processor 1030 confirms whether broadcasting content, having preferred resolutions for a recording request from a user device, exists in the DMS database 350. The processor 1030 records broadcasting content having normal resolutions when the broadcasting having the preferred resolution does not exist in the DMS database 350. The processor 1030 notifies rejection for a recording request, which is requested from a user device, to the user device when a priority of an ongoing recording request is higher than a priority of the recording request. The ongoing recording request is requested by other user devices. The processor 1030 determines a priority of a recording request by comparing a profile value of another user device with a profile value of a user device associated with the recording request. The recording request includes at least one among a name of a program, a name of a channel, genre, and user profile information. The processor 1030 processes a recording request based on a response for the notifying of obtainability received from a user device. For example, when a processor 1030 notifies, through a communicator, that broadcasting content can be obtained to a user device, the processor 1030 receives approval from the user device through the communicator and records the broadcasting content based on the approval. Otherwise, when the processor 1030 notifies, through the communicator, that broadcasting content can't be obtained to the user device, the processor 1030 notifies, through the communicator, a rejection message associated with a recording request to the user device.

For example, the processor 1030 controls the DMS 130 to perform procedures that are illustrated in FIGS. 1, 3, 4, 5, 6, 7, 8, 9, 12, and the like.

Figure 11:
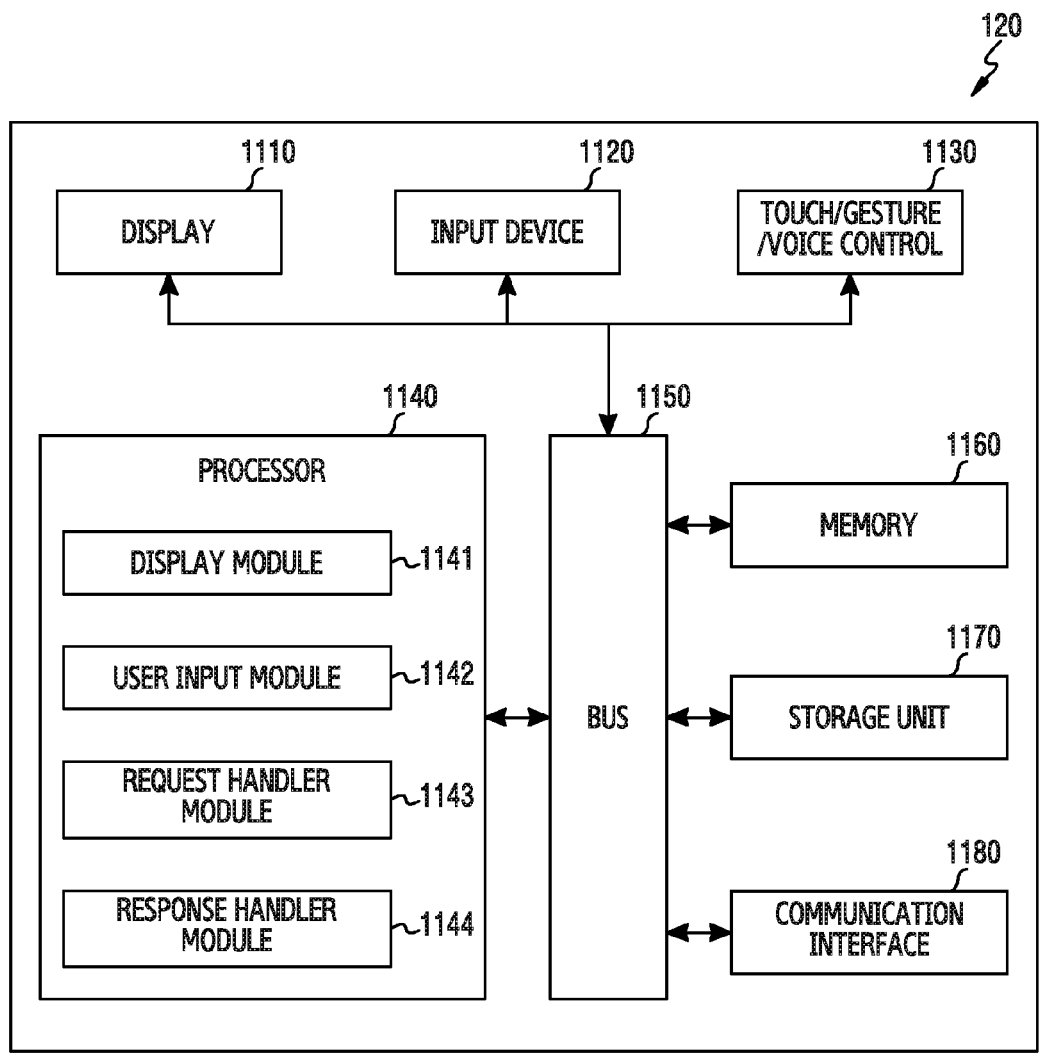
FIG. 11 illustrates a block diagram of the client device paired to the user control device, according to another embodiment of the present disclosure.

FIG. 11 illustrates a block diagram of a user control device 120, according to an embodiment of the present disclosure.

Referring to FIG. 11, the device 120 includes at least one of a bus 1150 and other communication mechanism for communicating information. The user control device 120 includes a processor 1140 coupled with the bus 1150. The processor 1140 includes an integrated electronic circuit for processing and controlling functionalities of the user control device 120. Further, the processor 1140 includes a display module 1141, a user input module 1142, a request handler module 1143, and a response handler module 1144.

Further, the user control device 120 includes a memory 1160, such as a RAM or other dynamic storage user control device, coupled to the bus 1150 for storing information to be used by the processor 1140. The memory 1160 is used for storing any temporary information required. A storage unit 1170, such as a magnetic disk or optical disk, is provided and coupled to the bus 1150 for storing information.

Various embodiments are related to the use of the user control device 120 for implementing the techniques described herein. In an embodiment of the present disclosure, the techniques are performed by the processor 1140 using information included in the memory 1160. The information is read into the memory 1160 from another non-transitory machine-readable medium, such as the storage unit 1170. The instructions are stored in the memory 1160.

The term "machine-readable medium" as used herein refers to a non-transitory medium that participates in providing data that causes a machine to operate in a specific fashion. In an embodiment of the present disclosure, implemented using the user control device 120, various non-transitory machine-readable medium are involved, for example, in providing information to the processor 1140. The non-transitory machine-readable medium can be a storage media. Storage media includes both non-volatile media and volatile media. Non-volatile media includes, for example, optical or magnetic disks, such as the storage unit 1170. Volatile media includes dynamic memory, such as the memory 1160. All such media must be tangible to enable the information carried by the media to be detected by a physical mechanism that reads the information into a machine.

The user control device 120 also includes a communication interface 1180 coupled to the bus 1150. The communication interface 1180 provides a two-way data communication and coupling to the storage unit 1170. The user control device 120 is coupled via the bus 1150 to a display 1110, such as but not limited to one of a cathode ray tube (CRT), a LCD and a light emitting diode (LED) display, for displaying information. An input device 1120, including alphanumeric and other keys, is coupled to the bus 1150 for receiving an input from a user. Another type of user input device is a touch, gesture, or voice control 1130 for communicating the input to the processor 1140 and for controlling cursor movement on the display 1110. The input device 1120 can also be included in the display 1110, for example a touch screen.

The display module 1141 displays information related to a DMS in the user control device 120. The user input module 1142 enables the user control device 120 to register to a DMS with a user profile. The request handler module 1143 initiates a recording request. The response handler module 1144 responds to the notification generated by the DMS.

Figure 12:
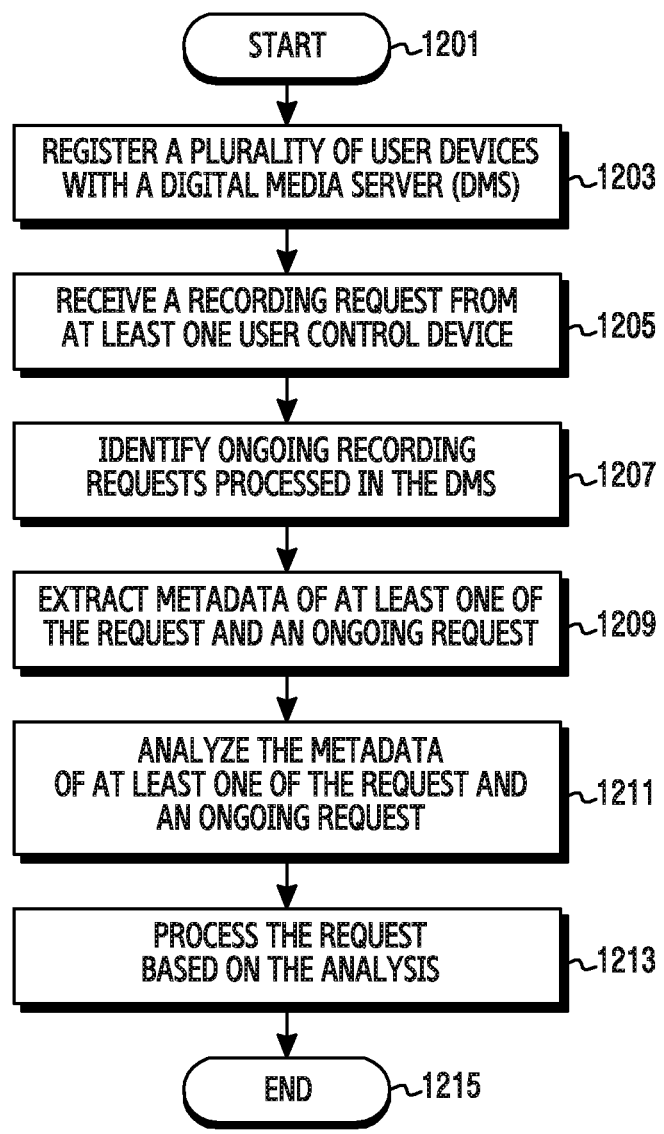
FIG. 12 illustrates a flowchart for processing recording requests in the home network by the DMS, according to another embodiment of the present disclosure.

FIG. 12 is a flowchart illustrating processing of recording requests in a home network by a DMS according to an embodiment of the present disclosure. The flowchart begins at operation 1201.

Referring to FIG. 12, at operation 1203, a plurality of user control devices register with a DMS. In an embodiment of the present disclosure the DMS is a STB. The DMS sends an acknowledgement to each of the plurality of user control devices.

At operation 1205, the DMS receives a recording request from at least one user control device among the plurality of user control devices. The DMS parses a user profile of the user initiating the recording request. Further, the DMS forwards the recording request to a service queue.

At operation 1207, the DMS identifies an ongoing recording request processed in the DMS by checks the service queue. In a scenario where the service queue is empty, the DMS processes the recording request. In a scenario where the service queue has an ongoing recording request, the DMS identifies the ongoing recording request.

At operation 1209, the DMS extracts the metadata of at least one of the recording request and the ongoing recording request. The metadata of the recording request allows the DMS to identify the broadcast content for which the recording request is to be processed. The metadata of the recording request includes program name, channel name, genre and user profile information.

At operation 1211, the DMS analyses the recording request of at least one of the recording request and the ongoing recording request on the basis of predefined rules. The predefined rules are followed by the DMS while performing a check in DMS database for existing recordings. Based on the predefined rules, the DMS continues an ongoing recording process of a broadcast content if the DMS receives a new recording request for the same broadcast content. Moreover, based on the predefined rules the DMS checks the availability of the requested broadcast content at another instance of time. Further, based on the predefined rules, the DMS checks for requested broadcast content of a preferred resolution. Furthermore, based on the predefined rules the DMS temporarily pauses a low priority recording request to process a high priority recording request. Moreover, based on the predefined rules the DMS records a requested broadcast content with normal resolution in the absence of the preferred resolution, and checks the availability of the requested broadcast content in a world-wide web.

At operation 1213, the DMS processes the recording request on the basis of the analysis performed in operation 1211. Processing the recording request includes notifying a user the availability of the requested content in the database. Further, processing includes sending at least one of acceptance and rejection notification to the plurality of user control devices. Moreover, processing includes seeking approval from a first user control device for processing a recording request from a second user control device. Furthermore, processing includes initiating recording of the broadcast content after performing analysis. The flowchart ends at operation 1215.

Figure 13A:
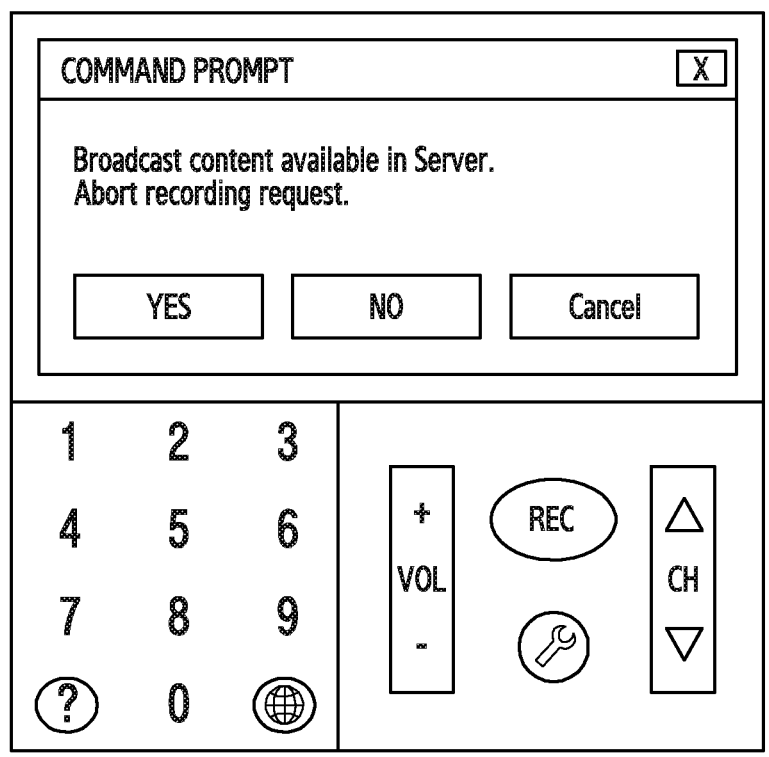
FIG. 13A is an illustration of a user control device displaying a message, according to an embodiment of the present disclosure.

FIG. 13A is an illustration of a user control device displaying a message, according to an embodiment of the present disclosure.

A DMS sends the message to a user control device if a user interaction is required for further processing of a recording request. In a scenario, referring to FIG. 13A, the DMS sends the message to the user control device informing availability of a requested broadcast content in a DMS database. Further, the DMS performs one of processing the recording request and aborting the recording request based on user selection.

Figure 13B:
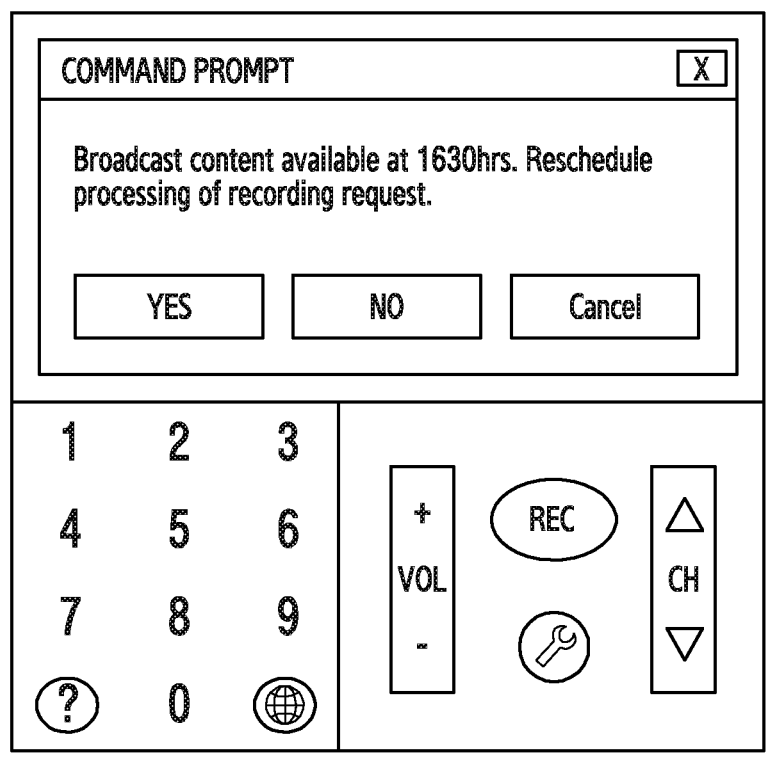
FIG. 13B is an illustration of the user control device displaying a message, according to another embodiment of the present disclosure.

FIG. 13B is an illustration of the user control device displaying a message, according to another embodiment of the present disclosure.

In a scenario, referring to FIG. 13B, the DMS receives a first recording request from a first user via a first user control device. Further, the DMS analyses the first recording request. The DMS parses an EPG for the requested broadcast content. The DMS processes the recording request. Further, the DMS receives a second recording request from a second user via a second user control device. The DMS analyses the second recording request. The second recording request is of higher priority when compared to the first recording request. The DMS discards the first recording request and processes the second recording request. Furthermore, the DMS checks the availability of the broadcast content requested by the first user. If the broadcast content is telecasted at a later period of time, the DMS seeks an approval from the first user for rescheduling the first recording request.

Figure 13C:
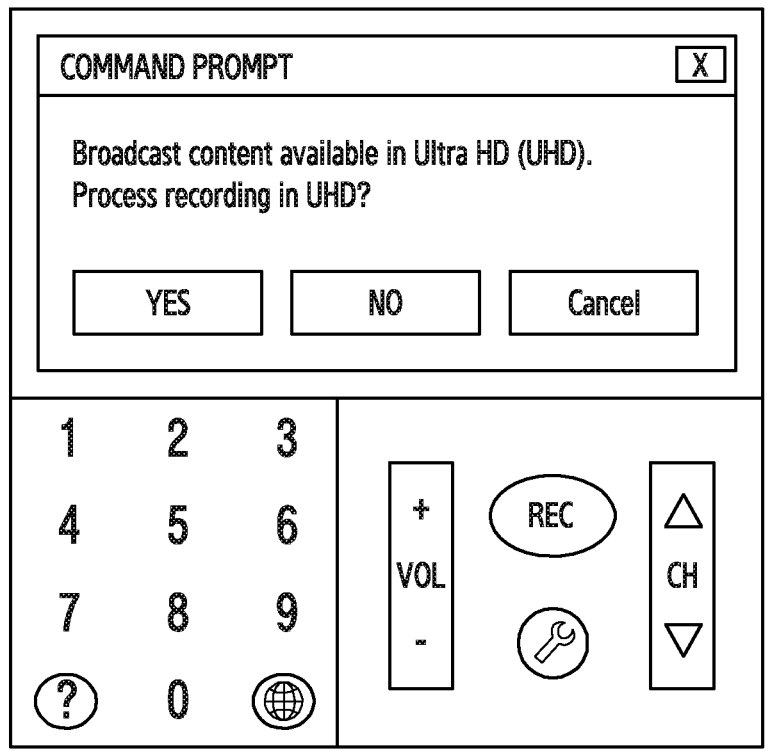
FIG. 13C is an illustration of the user control device displaying a message, according to another embodiment of the present disclosure.

FIG. 13C is an illustration of the user control device displaying a message, according to another embodiment of the present disclosure.

In a scenario, referring to FIG. 13C, a user sends a recording request to the DMS via the user control device. The DMS parses the user profile associated with the user. Further, the DMS parses the EPG for the requested broadcast content in a preferred resolution. In case the requested broadcast content is available in the preferred resolution, the DMS sends a message to the user control device seeking approval from the user so as to process the recording request accordingly.

Figure 13D:
FIG. 13D is an illustration of the user control device displaying a message, according to another embodiment of the present disclosure.

FIG. 13D is an illustration of the user control device displaying a notification, according to an embodiment of the present disclosure.

In a scenario, referring to FIG. 13D, a user sends the recording request to the DMS via a user control device. The DMS parses the user profile associated with the user. Further, the DMS parses the EPG for the requested broadcast content in a preferred resolution. If the requested broadcast content is unavailable in the preferred resolution, the DMS notifies the user about the unavailability of the requested broadcast content in the preferred resolution. Further, the DMS notifies the user of processing of the recording request in normal resolution.

Figure 13E:
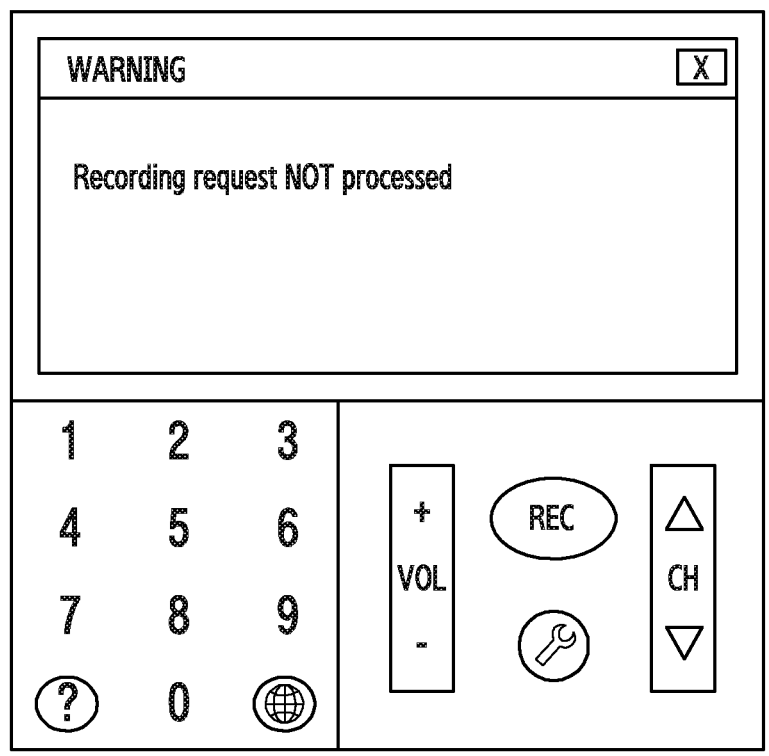
FIG. 13E is an illustration of the user control device displaying a notification, according to another embodiment of the present disclosure.

FIG. 13E is an illustration of the user control device displaying a notification, according to another embodiment of the present disclosure.

Referring to FIG. 13E, the DMS sends a rejection message in situations where the DMS fails to process the recording requests. The rejection message is due to one of unavailability of the requested broadcast content, processing of a recording request with higher priority, content unavailability, network bandwidth, memory shortage and loss of connection to the DMS.

In an embodiment of the present disclosure, the user control device is provided with a user interface. The user interface in the user control device enables the user control device to receive notifications from the DMS. Further, the user interface in the user control device is able to respond to the notifications. Furthermore, the user interface in the user control device transmits the response to the digital media server.

In an embodiment of the present disclosure, the DMS is to process a single recording request at a time. In such a scenario, the DMS processes the recording request by not considering the priority of the broadcast content and the profile value provided in the user profile. Further, the DMS notifies the user control device of the immediate processing of the recording request.

In another embodiment of the present disclosure, the DMS processes the recording request by checking the availability of the requested broadcast content in the www. In a scenario where the requested broadcast content is not available to the DMS, the DMS pulls down the requested broadcast content from the www. Further, the DMS notifies a user control device and records the content.

In yet another embodiment of the present disclosure, a user control device is disconnected from a first client device. Further, the user control device is paired to a second client device. On pairing with the second client device, the user control device re-registers with the DMS, thereby updating the pairing of the user control device to the second client device.

In yet another embodiment of the present disclosure, the user control device sends a recording request to a DMS in the form of HTTP messages. A HTTP within the DMS handles the recording request.

According to an embodiment of the present disclosure, a method of processing recording requests in a home network comprises registering of a plurality of user control devices with a DMS; receiving a recording request from at least one user control device by the DMS; identifying ongoing recording requests processed in the DMS; extracting metadata of at least one of the recording request and an ongoing recording request; analyzing the metadata of the at least one of the recording request and the ongoing recording request based on predefined rules; and processing the recording request based on the analysis.

According to an embodiment of the present disclosure, registering a user control device further comprises enabling a user to register to the DMS with a user profile.

According to an embodiment of the present disclosure, user profile comprises at least one of a media renderer ID, a profile value, a preferred resolution, and user preferences.

According to an embodiment of the present disclosure, user preferences comprises at least one of assigning a high priority for a user profile with a higher profile value in comparison to a plurality of user profiles; assigning a low priority to a recording request having repeated broadcast; assigning a high priority on availability of user preferred resolution; and assigning a high preference to a recording request of higher priority.

According to an embodiment of the present disclosure, predefined rules comprises at least one of checking a DMS database for existing recordings; continuing an ongoing recording request of a broadcast content if the recording request is for the same broadcast content; checking the availability of the requested broadcast content at another instance of time; checking for requested broadcast content of a preferred resolution; recording a requested broadcast content with normal resolution in the absence of the preferred resolution; and checking the availability of the requested broadcast content in www.

According to an embodiment of the present disclosure, analyzing the metadata of the at least one of the request and the ongoing request further comprises identifying the requested content; identifying the user control device associated with the request; determining priority of the request; and applying the predefined rules on the request.

According to an embodiment of the present disclosure, determining priority of request comprises comparing user profile value of the request with a plurality of user profile values; and associating priority to the user profile with a higher profile value.

According to an embodiment of the present disclosure, metadata of the request comprises program name, channel name, genre, and user profile information.

According to an embodiment of the present disclosure, processing comprises at least one of notifying a user the availability of the requested broadcast content in the DMS database; sending at least one of acceptance and rejection notification to the user control device in response to the request; seeking approval from a first user control device of the ongoing recording request for approving the request of the user control device; disabling temporarily the ongoing recording request; and recording of a broadcasted program after performing analysis.

According to an embodiment of the present disclosure, a method of processing recording requests in a home network further comprises notifying a user control device about the outcome of the recording request; and sending an approval request to the user control device for the recording request.

According to an embodiment of the present disclosure, a method of managing recording requests among multiple media rendering devices in a home network environment comprises the operation of registering a plurality of user control devices with a DMS; sending a recording request of a broadcasted content from a first user control device, wherein the first user control device is mapped to a first media renderer; receiving and extracting metadata of the recording request and metadata of ongoing recording requests by the media server; analyzing the metadata of the recording request based on predefined rules; and notifying outcome of the recording request to the first media renderer via the user control device.

According to an embodiment of the present disclosure, predefined rules comprises at least one of checking a DMS database for existing recordings; continuing an ongoing recording request of a broadcast content if the recording request is for the same broadcast content; checking the availability of the requested broadcast content at another instance of time; checking for requested broadcast content of a preferred resolution; recording a requested broadcast content with normal resolution in the absence of the preferred resolution; and checking the availability of the requested broadcast content in www.

According to an embodiment of the present disclosure, analyzing the metadata of the at least one of the request and the ongoing request further comprises identifying the requested content; identifying the user control device associated with the recording request; determining priority of the recording request; and applying the predefined rules on the recording request.

According to an embodiment of the present disclosure, metadata of the recording request comprises program name, channel name, genre, and user profile information.

According to an embodiment of the present disclosure, the outcome of the recording request comprises at least one of seeking approval from a second user control device of the ongoing recording request for proceeding with the recording request of the first user control device; seeking approval from a first user control device for proceeding with the recording request; and notifying the first user control device at least one of acceptance, rejection and postponement of the recording request.

According to an embodiment of the present disclosure, a method of managing recording requests among multiple media rendering devices in a home network environment further comprises notifying the first user control device the availability of the requested content in the DMS database of the DMS.

According to an embodiment of the present disclosure, a method of managing recording requests among multiple media rendering devices in a home network environment further comprises notifying the first user control device of the ongoing recording request processed by another user control device for the same broadcast content.

According to an embodiment of the present disclosure, a method of managing recording requests among multiple media rendering devices in a home network environment further comprises notifying the first user control device a rejection of the recording request in response to the priority assigned to the ongoing recording requests; and notifying the first user control device an acceptance of the recording request at another instance of time.

According to an embodiment of the present disclosure, a method of managing recording requests among multiple media rendering devices in a home network environment further comprises: notifying the first user control device of unavailability of requested broadcast content with user preferences; and notifying the first user control device an acceptance of the recording request in absence of requested broadcast content with user preferences.

According to an embodiment of the present disclosure, a system for managing a plurality of requests among multiple renderer devices in home network, the system comprises a DMS to manage the plurality of recording requests, the DMS further comprising a registration module to enable registration of a plurality of user control devices with the DMS; a response handler module to receive a recording request from at least one of the user control device; a recorder management module to identify ongoing recording requests processed in the DMS; a metadata retrieving module to extract metadata of at least one of the recording request and an ongoing recording request; and a decision undertaking module to perform operations of: analyzing the metadata of the at least one of the recording request and the ongoing recording request based on predefined rules; and notifying outcome of the recording request to the media rendering device via the user control device; and a plurality of media rendering devices paired to the plurality of user control devices connected in a home network, wherein each of the plurality of media rendering devices further comprising a display module for rendering a broadcast content; a user input module for enabling at least one of the user control device to register with a user profile; a request handler module to initiate a recording request; and a response handler module to respond to the notification generated by the DMS.

According to an embodiment of the present disclosure, notification generated by the DMS comprises at least one of seeking approval from a second user control device of the ongoing request for proceeding with the recording request of the first user control device; seeking approval from a first user control device for proceeding with the recording request; and notifying the first user control device at least one of acceptance, rejection and postponement of the recording request.

According to an embodiment of the present disclosure, user control device is at least one of a remote control, a smartphone, a tablet, a gear, and a smart glass.

Advantageously, the various embodiments specified in the present disclosure provide a content recording management system to one or more devices connected in a home network. The proposed disclosure allows a DMS to manage a plurality of recording requests from a plurality of user control devices connected in a home network. The main advantage of the disclosure is that the DMS specified herein is a time and space efficient system. Further, DMS manages the recording request from the plurality of user control devices based on a profile value assigned to the individual client devices. Further, the DMS processes the multiple recording requests based on user defined parameters. More importantly, DMS parses an electronic program guide to perform scheduling of the broadcast content in a manner by which the DMS is able to process the recording requests of repeated broadcast contents with less priority.

While the present disclosure has been shown and described with reference to various embodiments thereof, it will be understood by those skilled in the art that various changes in form and details may be made therein without departing from the spirt and scope of the present disclosure as defined by the appended claims and their equivalents.

What is claimed is:

1. A method for operating a media server, the method comprising:

receiving, from a first device a first recording request for first content;

receiving, from a second device which is different from the first device, a second recording request for second content during a process of the first recording request;

if the first content and the second content are identical, maintaining the process of the first recording request; and if the first content and the second content are different,
  determining a priority of the first recording request and a priority of the second recording request based on a profile for the first device and a profile for the second device, and
  processing the second recording request by aborting the process of the first recording request upon determining that the priority of the second recording request is greater than the priority of the first recording request, wherein the profile for the first device and the profile for the second device are registered in the media server.

2. The method of claim 1, wherein the profile for the first device and the profile for the second device each comprise at least one among a media renderer identity, a profile value, a preferred resolution, and a user preference.

3. The method of claim 2, wherein the user preference is determined based on at least one of obtainability of broadcasting content having preferred resolutions and a profile value comparison between user profiles.

4. The method of claim 1, further comprising:
when the priority of the first recording request is greater than the priority of the second recording request, transmitting, to the second device, a message indicating a rejection of the second recording request.

5. The method of claim 1, wherein a notification of the first recording request is transmitted to the second device.

6. The method of claim 1, wherein the determining of the priority of the first recording request and the priority of the second recording request comprises comparing a profile value of the first device with a profile value of the second device.

7. The method of claim 1, wherein the second recording request comprises a name of a program, a name of a channel, a genre, and user profile information.

8. The method of claim 1, wherein the processing of the second recording request comprises:
transmitting, to at least one device, a notification of obtainability of broadcasting content associated with the second recording request based on a preferred resolution,
receiving, from the at least one device, at least one response to the notification of the obtainability, and
recording the broadcasting content based on the at least one response.

9. A media server apparatus comprising:
at least one transceiver configured to:
  receive, from a first device, a first recording request for first content,
  receive, from a second device which is different from the first device, a second recording request for second content during a process of the first recording request; and
a processor configured to:
  if the first content and the second content are identical, maintain the process of the first recording request, and
  if the first content and the second content are different, determine a priority of the first recording request and a priority of the second recording request based on a profile for the first device and a profile for the second device, and process the second recording request by aborting the process of the first recording request upon determining that the priority of the second recording request is greater than the priority of the first recording request, wherein the profile for the first device and the profile for the second device are registered in the media server.

10. The apparatus of claim 9, wherein the profile for the first device and the profile for the second device each comprise at least one among a media renderer identity, a profile value, a preferred resolution, and a user preference.

11. The apparatus of claim 10, wherein the user preference is determined based on at least one of obtainability of broadcasting content having preferred resolutions and a profile value comparison between user profiles.

12. The apparatus of claim 9, wherein the processor is further configured to:

when the priority of the first recording request is greater than the priority of the second recording request, transmit, to the second device, a message indicating a rejection of the second recording request.

13. The apparatus of claim 9, wherein a notification of the first recording request is transmitted to the second device.

14. The apparatus of claim 9, wherein the processor is further configured to compare a profile value of the first device with a profile value of the second device.

15. The apparatus of claim 9, wherein the second recording request comprises a name of a program, a name of a channel, a genre, and user profile information.

16. The apparatus of claim 9, wherein the communicator is further configured to:

transmit, to at least one device, a notification of obtainability of broadcasting content associated with the second recording request based on a preferred resolution, and receive, from the at least one device, at least one response to the notification of the obtainability, and wherein the processor is further configured to record the broadcasting content based on the at least one response.

* * * * *